US011521268B1

(12) United States Patent
Bischoff et al.

(10) Patent No.: US 11,521,268 B1
(45) Date of Patent: Dec. 6, 2022

(54) DYNAMIC USAGE-BASED POLICIES

(71) Applicant: Allstate Insurance Company, Northbrook, IL (US)

(72) Inventors: Christine L. Bischoff, La Grange, IL (US); Dana Ferguson, Chicago, IL (US); Eric Huls, Chicago, IL (US); Grady Irey, Des Plaines, IL (US); William Polisson, Vernon Hills, IL (US); Caryl M. Styrsky, Wheeling, IL (US); Ralph Adam Benjamin Tyner, Gurnee, IL (US); Meg G. Walters, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/361,564

(22) Filed: Jun. 29, 2021

Related U.S. Application Data

(63) Continuation of application No. 16/513,162, filed on Jul. 16, 2019, now Pat. No. 11,068,985, which is a
(Continued)

(51) Int. Cl.
*G06Q 40/04* (2012.01)
*G06Q 20/10* (2012.01)

(52) U.S. Cl.
CPC ............. *G06Q 40/04* (2013.01); *G06Q 20/10* (2013.01)

(58) Field of Classification Search
USPC ............................................................ 705/4
See application file for complete search history.

(56) References Cited

U.S. PATENT DOCUMENTS 5,797,134 A    8/1998   McMillan et al.
5,956,691 A    9/1999   Powers
(Continued)

FOREIGN PATENT DOCUMENTS

JP     2002024553 A     1/2002

OTHER PUBLICATIONS

PriPAYD: Privacy-Friendly Pay-as-You-Drive Insurance Carmela Troncoso, George Danezis, Eleni Kosta, Josep Balasch, and Bart Preneel, Member, IEEE (Year: 2011).*
(Continued)

*Primary Examiner* — William E Rankins
(74) *Attorney, Agent, or Firm* — Dinsmore & Shohl, LLP

(57) ABSTRACT

Methods, computer-readable media, systems and apparatuses for determining and implementing dynamic usage-based insurance policies are presented. A cost per day and a cost per mile associated with the dynamic usage-based insurance policy may be determined. The cost per mile may be computed independently for each of a plurality of road segments comprising a trip based on a time of day that the vehicle traveled each road segment, a road type associated with each road segment. The cost per mile of each road segment of the driving trip may further include whether or not hard braking or hard cornering events were encountered during a specified cumulative driving distance that may include, at least a portion, of a plurality of driving trips. The cost per mile for each of the plurality of driving trips may be adjusted once a threshold distance has been traveled by the vehicle based on the number of hard braking events and hard cornering events occurred during that distance.

20 Claims, 15 Drawing Sheets

Related U.S. Application Data continuation of application No. 15/430,963, filed on Feb. 13, 2017, now Pat. No. 10,430,883.

(60) Provisional application No. 62/294,757, filed on Feb. 12, 2016.

(56) References Cited

U.S. PATENT DOCUMENTS

| | | | |
|---|---|---|---|
| 6,064,970 | A | 5/2000 | McMillan et al. |
| 6,397,212 | B1 | 5/2002 | Biffar |
| 6,415,226 | B1 | 7/2002 | Kozak |
| 6,868,386 | B1 | 3/2005 | Henderson et al. |
| 7,516,079 | B2 | 4/2009 | Harrison et al. |
| 7,987,103 | B2 | 7/2011 | Gay et al. |
| 8,606,512 | B1 | 12/2013 | Bogovich et al. |
| 9,031,545 | B1 | 5/2015 | Srey et al. |
| 9,390,452 | B1 * | 7/2016 | Biemer ............... G01C 21/3469 |
| 9,454,786 | B1 | 9/2016 | Srey et al. |
| 10,664,917 | B1 | 5/2020 | Wasserman |
| 10,817,950 | B1 | 10/2020 | Iqbal et al. |
| 2001/0044733 | A1 | 11/2001 | Lee et al. |
| 2002/0111725 | A1 | 8/2002 | Burge |
| 2002/0128882 | A1 | 9/2002 | Nakagawa et al. |
| 2002/0178033 | A1 | 11/2002 | Yoshioka et al. |
| 2003/0033173 | A1 | 2/2003 | Suzuki et al. |
| 2003/0069761 | A1 | 4/2003 | Nozaki et al. |
| 2003/0187704 | A1 | 10/2003 | Hashiguchi et al. |
| 2003/0229528 | A1 | 12/2003 | Nitao et al. |
| 2003/0236686 | A1 | 12/2003 | Matsumoto et al. |
| 2004/0024620 | A1 | 2/2004 | Robertson et al. |
| 2004/0039548 | A1 | 2/2004 | Selby et al. |
| 2004/0039611 | A1 | 2/2004 | Hong et al. |
| 2004/0139034 | A1 | 7/2004 | Farmer |
| 2004/0153362 | A1 | 8/2004 | Bauer et al. |
| 2004/0178883 | A1 | 9/2004 | Haselsteiner et al. |
| 2005/0027546 | A1 | 2/2005 | Wiest et al. |
| 2005/0091175 | A9 | 4/2005 | Farmer |
| 2006/0095301 | A1 | 5/2006 | Gay |
| 2007/0061173 | A1 | 3/2007 | Gay |
| 2007/0282638 | A1 | 12/2007 | Surovy |
| 2007/0297700 | A1 | 12/2007 | Berman |
| 2007/0299700 | A1 | 12/2007 | Gay et al. |
| 2008/0162193 | A1 | 7/2008 | Voggenauer |
| 2009/0312945 | A1 | 12/2009 | Sakamoto et al. |
| 2013/0006674 | A1 | 1/2013 | Bowne et al. |
| 2014/0046701 | A1 | 2/2014 | Steinberg et al. |
| 2016/0086285 | A1 | 3/2016 | Jordan Peters et al. |

OTHER PUBLICATIONS

Data Acquisition, Analysis and Transmission Platform for a Pay-as-You-Drive System Luciano Boquete *, José Manuel Rodríguez-Ascariz, Rafael Barea, Joaquín Cantos, Juan Manuel Miguel-Jiménez and Sergio Ortega (Year: 2010).*

Data Acquisition, Analysis and Transmission Platform for a Pay-as-You-Drive System Luciano Boquete *, José Manuel Rodríguez-Ascariz, Rafael Barea, Joaquín Cantos, Juan Manuel Miguel-Jiméenez and Sergio Ortega (Year: 2015).*

Litman, Todd, Appendices of "Distance-Based Vehicle Insurance Feasibility, Costs and Benefits", Aug. 7, 2001, pp. 1-40, Victoria Transport Policy Institute, Victoria, British Columbia, Canada.

Litman, Todd, "Implementing Pay-as-You-Drive Vehicle Insurance", Jul. 2002, pp. 1-14, Victoria Transport Policy Institute for the Institute for Public Policy Research (London), Victgora, British Columbia, Canada.

Litman, Todd, "Pay-as-You-Drive Pricing for Insurance Affordability", May 17, 2004, pp. 1-17, Victoria Transport Policy Institute, Victoria, British Columbia, Canada.

Litman, Todd, "Distance-Based Vehicle Insurance Feasibility, Costs and Benefits", Jul. 8, 2004, pp. 1-85, Victoria Transport Policy Institute, Victoria, British Columbia, Canada.

Funderburg, et al., Keri, "Changing Insurance One Mile at a Time", Nov./Dec. 2003, pp. 34-38, Contingencies.

AXA Broker, "Traksure", Jan. 14, 2004, 3pps., from website: "http://www.guardian.ie/traksure/".

Moran, Nuala, "Covering Risk Against Reward—Case Study—Insurance Sector", Aug. 6, 2003, 2 pps. from website: http://global.factiva.colm/en/arch/save-results.asp, The Financial Times Limited.

MacSweeney, G., "Progressive Awarded Patent for GPS Rating: Company Business and Marketing", Oct. 1, 2000, 2 pps. from website: http://www.nexis.com/research/search/submitviewtagged, Gale Group, Inc.

O'Connor, Robert, "U.K.'s Norwich Union Studies Linking Premiums to Drivers' Use of Cars", Aug. 18, 2004, pp. 1-2, A.M. Best Comapny, Inc.

E-Business Strategies, Inc., "Progressive Insurance: Creating Value via Mobile Field Service", Apr. 2003, pp. 1-11, E-Business Strategies, Inc.

Norwich Union and Trafficmaster sign deal for black boxes, Article from Aviva dated May 3, 2006, 3 pages.

Presentation to investors and analysts on Aviva's UK general insurance business, Article from Aviva dated May 20, 2003, 2 pages.

Norwich Union appoints IBM and Orange for Pay as You Drive Insurance, Article from Aviva dated Mar. 12, 2003, 3 pages.

Trafficmaster profits accelerate, BBC News, retrieved from http://news.bbc.co.uk/go/pr/fr/-/2/hi/business/4351035.stm, Published Mar. 15, 2005, © BBC 2016, 1 page.

Insurer to provide tailored 'Pay as You Drive' insurance premiums for young drivers, Article from Aviva dated Jan. 12, 2005, 4 pages.

Norwich Union heralds new Pay as You Drive insurance, Article from Aviva dated Feb. 20, 2002, 3 pages.

Aviva calls on motorists to sign up to test new pay-how-you-drive motor insurance, Article from Aviva dated Aug. 13, 2012, 3 pages.

Norwich Union road-tests revolutionary new motor insurance, Article from Aviva dated Aug. 18, 2004, 3 pages.

Norwich Union launches Fleet Telematics product, Article from Aviva dated Sep. 30, 2004, 3 pages.

Risk news 'Usage based' motor insurance launched, dated Oct. 5, 2006, © 2016 Aviva, 2 pages.

Norwich Union launches innovative "Pay As You Drive" insurance prices from 1p per mile, Article from Aviva dated Oct. 5, 2006, 4 pages.

Norwich Union launches "Pay as You Drive" insurance online, Article from Aviva dated Jan. 22, 2007, 2 pages.

Feb. 4, 2019—U.S. Non-Final Office Action—U.S. Appl. No. 15/430,963.

May 22, 2019—U.S. Notice of Allowance—U.S. Appl. No. 15/430,963.

Dec. 21, 2020—U.S. Non-Final Office Action—U.S. Appl. No. 16/513,162.

Jan. 26, 2021—U.S. Final Office Action—U.S. Appl. No. 16/513,162.

Mar. 23, 2021—U.S. Notice of Allowance—U.S. Appl. No. 16/513,162.

* cited by examiner

DYNAMIC USAGE-BASED POLICIES

CROSS REFERENCE TO RELATED APPLICATION(S)

This application is a continuation of U.S. patent application Ser. No. 16/513,162, filed Jul. 16, 2019, entitled "DYNAMIC USAGE-BASED POLICIES", which claims priority to non-provisional patent application Ser. No. 15/430,963 filed Feb. 13, 2017, which claims priority to provisional Patent Application No. 62/294,757 entitled "DYNAMIC USAGE-BASED POLICIES" filed on Feb. 12, 2016, which is incorporated by reference.

FIELD OF THE INVENTION

Various aspects of the disclosure relate to usage-based insurance systems for determining and implementing usage-based insurance policies. More specifically, aspects of the disclosure relate to determining cost per day and cost per mile based on received driving data.

BACKGROUND OF THE INVENTION

Vehicle insurance policies are generally purchased by insurance customers from various insurance providers. Conventional policies generally provide coverage to the user for a term of the policy based on payment of a premium associated with the policy. Such term based policies might not account for driving behaviors, environmental conditions, or the like. Rather, coverage may be provided for the term, regardless of how, where, when, etc. the driver operates the vehicle.

Many vehicles include sensors and internal computer systems designed to store and monitor driving data, vehicle operation data, driving conditions, and driving functions. Many vehicles also include one or more communication systems designed to send and receive information from inside or outside the vehicle. Such information can include, for example, vehicle operational data, driving conditions, and communications from other vehicles or systems.

SUMMARY OF THE INVENTION

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for determining a cost per day and/or a cost per mile for a dynamic usage-based insurance policy. Methods, computer-readable media, systems and apparatuses for determining and implementing dynamic usage-based insurance policies are presented. A cost per day and a cost per mile associated with the dynamic usage-based insurance policy may be determined. The cost per mile may be computed independently for each of a plurality of road segments comprising a trip based on a time of day that the vehicle traveled each road segment, a road type associated with each road segment. The cost per mile of each road segment of the driving trip may further include whether or not hard braking or hard cornering events were encountered during a specified cumulative driving distance that may include, at least a portion, of a plurality of driving trips. The cost per mile for each of the plurality of driving trips may be adjusted once a threshold distance has been traveled by the vehicle based on the number of hard braking events and hard cornering events occurred during that distance.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

Figure 11:
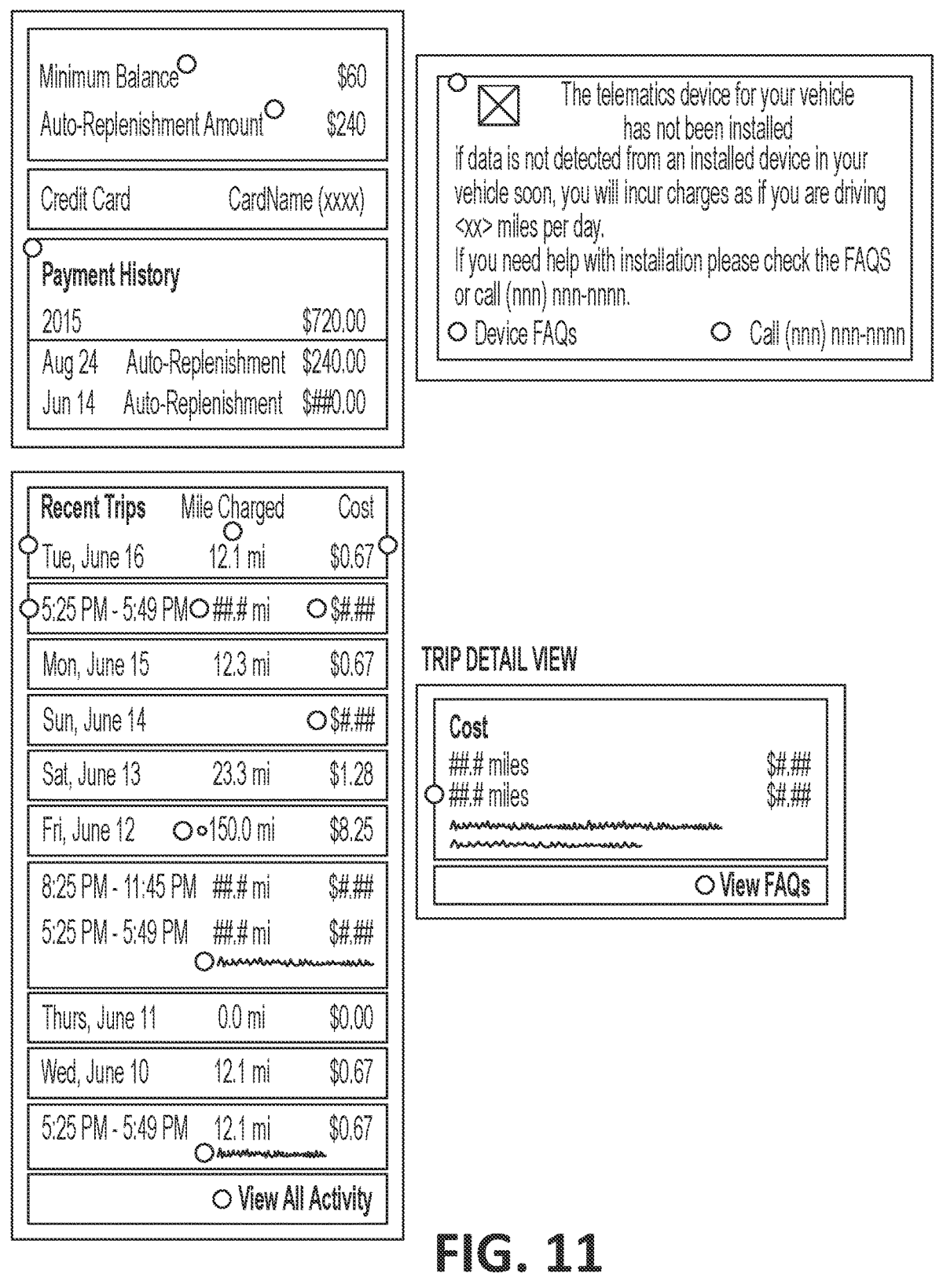
Figure 13:
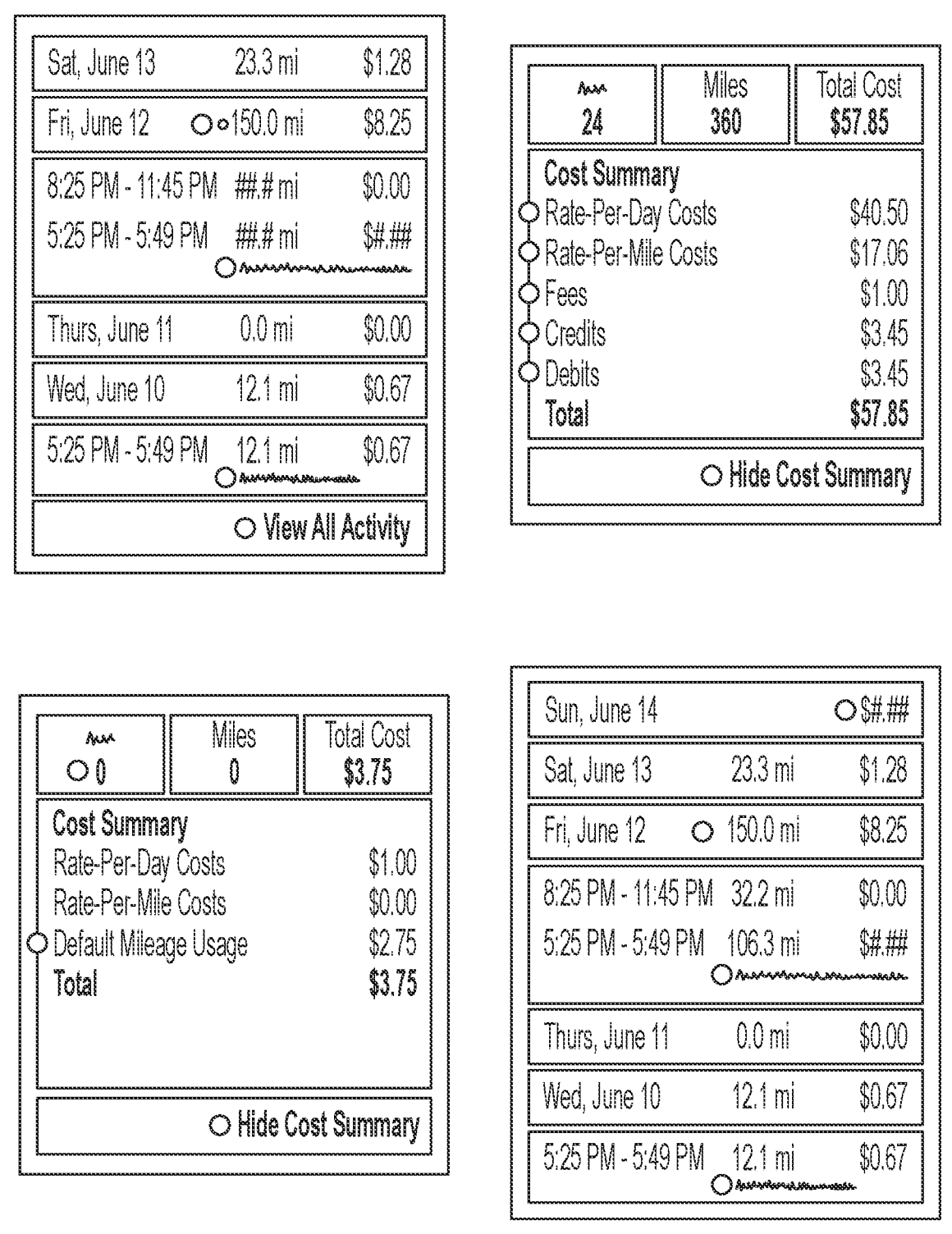
Figure 14:
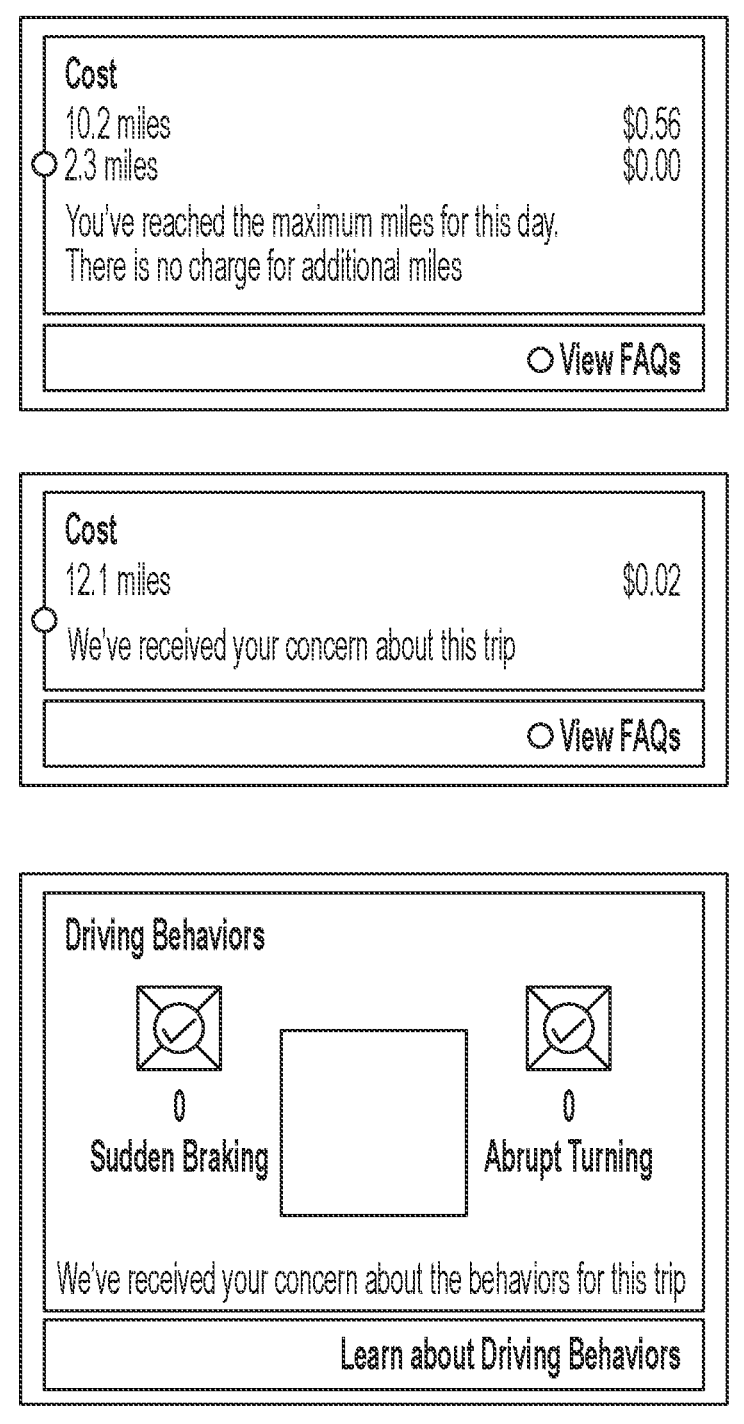

FIGS. 11-15 show illustrative user interface screens, or portions thereof, that may be provided to a user to provide information associated with the dynamic usage based insurance discussed herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
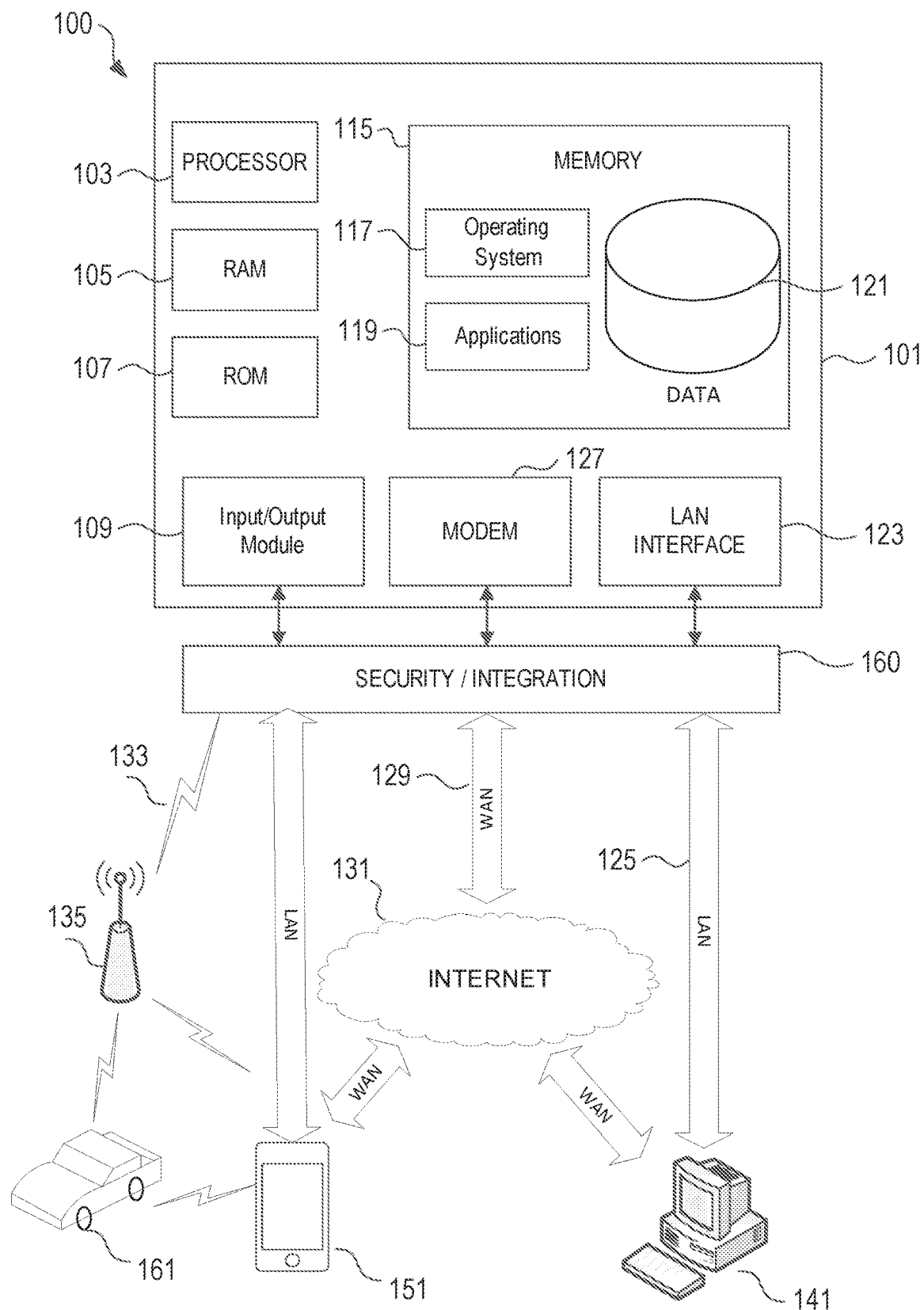
FIG. 1 illustrates computing systems and a network environment that may be used to implement aspects of the disclosure.

FIG. 1 illustrates a block diagram of a computing device (or system) 101 in a computer system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141 and 151, security and integration hardware 160) may correspond to any of multiple systems or devices described herein, such as personal mobile devices, vehicle-based computing devices, insurance systems servers, external data sources and other various devices in a usage based insurance system. These various computing systems may be configured individually or in combination, as described herein, for determining or providing a dynamic usage based insurance policy to a user based on a determined daily rate and a determined mileage rate for each trip traveled by the user. The mileage rate may be calculated for each segment (e.g., 0.1 miles, etc.) traveled along the route and be based on a road type being traveled, a time of day, whether one or more driving events (e.g., a hard braking event, a hard cornering event, etc.) was encountered as captured through use of onboard sensors (e.g., location information, velocity information, acceleration information, time information, driver information, vehicle information, and the like) associated with the vehicle. The dynamic usage based insurance costs may also be determined based on various driving factors, external factors, traditional insurance factors and/or the like. A user may be enrolled into the program via a user interface connection facilitated through an entity server, either in an automated process or with help from an agent. User interface screens may be provided such that the user may enroll in a dynamic usage based insurance program, set up an account from which premiums may be deposited and/or transferred as the usage occurs (e.g., per trip, per day, etc.). In some cases, the account may be automatically refilled upon the balance reaching a predetermined threshold, and the like using the devices of the dynamic usage based insurance systems described herein. In addition to the features described above, the techniques described herein also may be used for generating and presenting insurance recommendations to customers, insurance underwriting, and other insurance-related tasks.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within usage based insurance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, insurance system server 101, etc.), in order to collect and analyze driver data, vehicle data, and/or driving trip data, determine usage based insurance policy parameters, determine dynamic usage based costs incurred during operation of a vehicle, etc., using the various devices of the usage based insurance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, determining or providing a dynamic usage based insurance policy to a user based on a determined daily rate and a determined mileage rate for each trip traveled by the user. The mileage rate may be calculated for each segment (e.g., 0.1 miles, etc.) traveled along the route and be based on a road type being traveled, a time of day, whether one or more driving events (e.g., a hard braking event, a hard cornering event, etc.) was encountered as captured through use of onboard sensors (e.g., location information, velocity information, acceleration information, time information, driver information, vehicle information, and the like) associated with the vehicle. The dynamic usage based insurance costs may also be determined based on various driving factors, external factors, traditional insurance factors and/or the like. A user may be enrolled into the program via a user interface connection facilitated through an entity server, either in an automated process or with help from an agent. User interface screens may be provided such that the user may enroll in a dynamic usage based insurance program, set up an account from which premiums may be deposited and/or transferred as the usage occurs (e.g., per trip, per day, etc.). In some cases, the account may be automatically refilled upon the balance reaching a predetermined threshold, and the like using the devices of the dynamic usage based insurance systems described herein The computing device (e.g., a personal mobile device, vehicle-based system, insurance system server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 160, through which communications are sent and managed between the device 101 (e.g., a personal mobile device, a vehicle-based computing device, an insurance server, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 141, 151, and 161. In some cases, the security and integration layer 160 may correspond to a set of dedicated hardware and/or software operating at the same physical location and under the control of same entities as device 101. For example, layer 160 may correspond to one or more dedicated web servers and network hardware in a vehicle and driver information datacenter or in a cloud infrastructure supporting a cloud-based vehicle identification and vehicle and driver data retrieval and analysis. In other examples, the security and integration layer 160 may correspond to separate hardware and software components which may be operated at a separate physical location and/or by a separate entity.

As discussed below, the data transferred to and from various devices in a usage based insurance system 100 may include secure and sensitive data, such as confidential vehicle operation data, insurance policy data, and confidential user data from drivers and passengers in vehicles. Therefore, it may be desirable to protect transmissions of such data by using secure network protocols and encryption, and also to protect the integrity of the data when stored on the various devices within a personalized insurance system, such as personal mobile devices, vehicle-based devices, insurance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, driving trip data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, and/or driving trip data analysis web service, a usage based insurance policy determination or offer web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, driving behaviors or characteristics, passenger-related data, vehicle data, driving trip data, account balance data, etc.) is cached in a separate smaller database on an application server separate from the database server (e.g., at a personal mobile device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of usage based insurance systems, such as faster response times and less dependence on network conditions when transmitting and receiving driver information, vehicle information, driving trip information, insurance parameters, account balance information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in usage based insurance system components described herein may be configured to communicate using any of these network protocols or technologies.

Additionally, one or more application programs 119 may be used by the various computing devices 101 within a usage based insurance system 100 (e.g., vehicle data, driver data, and/or driving trip data analysis software applications, insurance parameter determination software applications, usage based policy account applications, etc.), including computer executable instructions for receiving and analyzing various driver data, vehicle data, and/or driving trip data, determining parameters for usage based insurance policies, presenting usage based insurance policies via the devices in the usage based insurance system, determining or providing a dynamic usage based insurance policy to a user based on a determined daily rate and a determined mileage rate for each trip during operation of a vehicle, and evaluating and/or automatically refilling a balance of an account associated with user using the devices of the dynamic usage based insurance systems.

Figure 2:
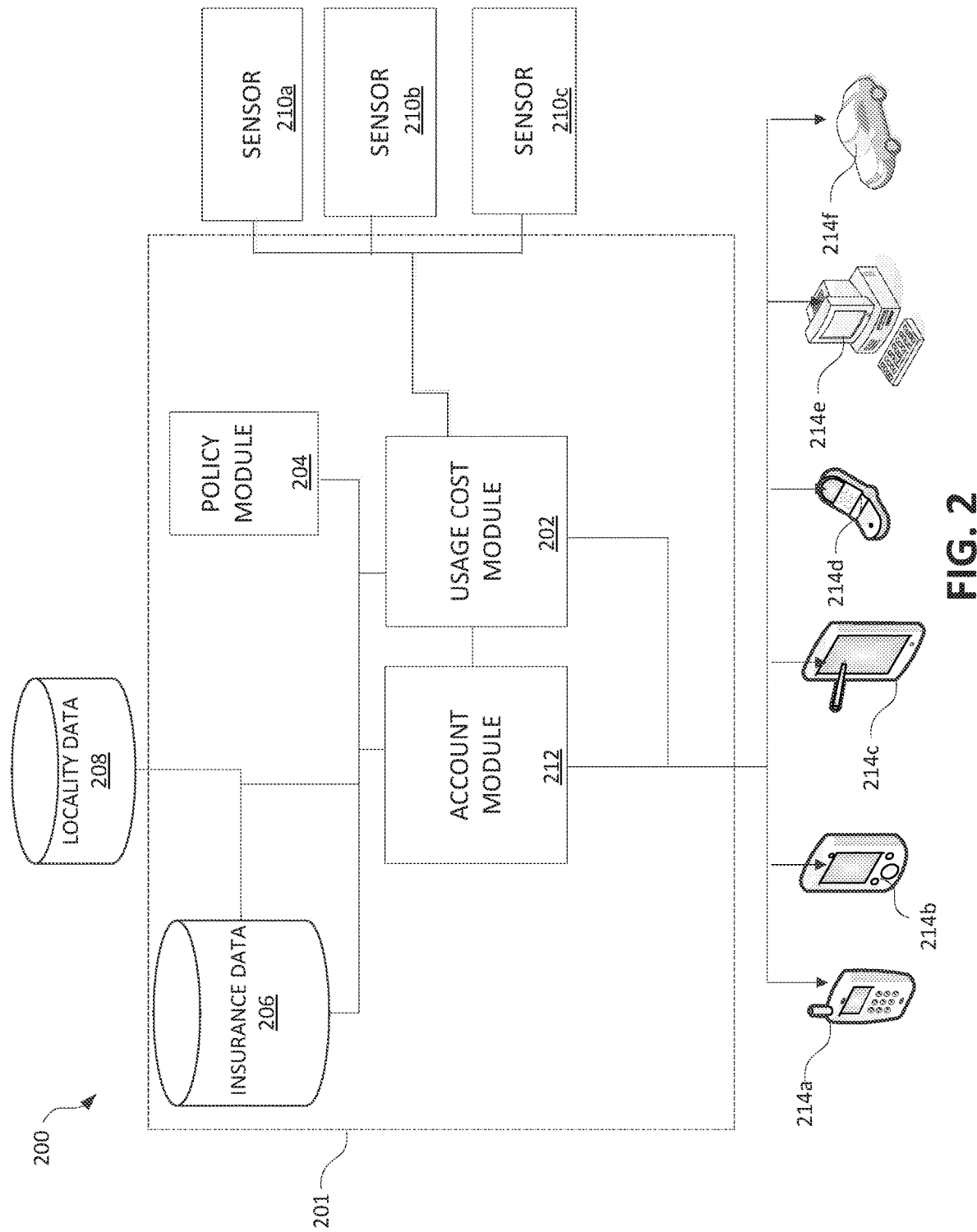
FIG. 2 shows an illustrative usage based insurance system according to one or more aspects of the disclosure.

FIG. 2 is a schematic diagram of an illustrative usage-based insurance system 200. The usage-based insurance system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The usage-based insurance system 200 may include one or more modules that may include hardware and/or software configured (e.g., specifically programmed, etc.) to perform various functions within the usage-based insurance system 200. The one or more modules may be separate, physical devices or, in other examples, one or more modules may be part of the same physical device. As indicated above, the usage-based insurance system 200 may include various additional modules in addition to those modules shown in FIG. 10.

For instance, the usage-based insurance system 200 may include a usage cost module 202 configured to determine a cost or amount of funds to charge a driver (or a vehicle) based on the driver's operation of the vehicle. For instance, the usage cost module 202 may include hardware and/or software configured to perform various functions, including receiving insurance policy information, such as from policy module 204. The policy module 204 may include or otherwise access information such as insurance data from insurance data store 206, locality or environmental/contextual data from locality data store 208, as well as other data (from data stores not shown that may be internal to the entity 201 or external to the entity 201). The policy module 204 may transmit or otherwise communicate this information to the usage cost module 202. The usage cost module 202 may determine, based on the received data, the insurance costs for a particular driver to operate a vehicle and/or the insurance costs for a particular vehicle to operate. That is, the usage cost module 202 may determine a cost per day and/or a cost per mile for the user and/or the vehicle. This information may be based on various factors, including driving history, vehicle specifications, historical driving data (if available), environmental data, and the like.

For instance, a driver with a new policy may receive usage cost information determined based on accident history and vehicle specifications. This information may be used to determine a cost per day and/or per mile for the driver and/or the vehicle. This cost per day and/or cost per mile may be used to determine an insurance cost for one or more driving trips performed by the user or the vehicle. However, in some arrangements, these costs may be used until additional information has been collected for the driver and/or the vehicle. For instance, one or more sensors 210a-210c may be used to collect vehicle information. Sensors 210a-210c may be used to obtain data that may be used to determine a revised cost per day and/or cost per mile for the user and/or the vehicle. For instance, the one or more sensors 210a-210c may include sensors to detect driving behaviors of the user, such as hard braking, hard cornering, speeding, and the like. In some cases, the one or more sensors 210a-210c may be used to detect environmental conditions such as precipitation, humidity, cloud cover, or the like. In some cases, the one or more sensors 210a-210c may be used to determine road conditions or to obtain information from outside sources (e.g., external databases, or the like) regarding traffic conditions, types of road (e.g., two-lane road, four-lane road), speed limit of the road, or the like. The data from the one or more sensors 210a-210c, which may include data from combinations of different types of sensors and may be used by the usage cost module 202 to determine a revised cost per day and/or cost per mile for the user.

As mentioned above, the usage-based insurance system 200 may further include a policy module 204. The policy module 204 that may generate and/or store insurance policies and policy information, as well as insurance policy factors, such as vehicle information, driving record/experience, policy limits, deductibles, etc. That is, a user may be insured through a policy that provides, for a period of time (e.g., a trip duration, a day, a week, a month, 6 months, a year, etc.), coverage for a vehicle. The policy may be a usage-based policy (e.g., rather than a traditional policy) in which the user may pay a premium at the start of the policy period. The premium may be held in an account associated with the user and/or the vehicle in, for instance, account module 212. The account module 212 may store the pre-paid premium and, as the user operates the vehicle, the premium held in the account may be reduced by an amount associated with insurance costs corresponding to a particular trip or a number of trips (e.g., based on the determined cost per day and/or cost per mile). Reducing the premium may include transferring funds from the account of the user in the account module 212 (which may be an account held by the entity 201) to another account (e.g., an account of the entity 201). In some examples, the funds may be transferred from the account in the account module 212 to the second account of the entity as each trip occurs, at the end of each day, or the like. In other examples, trip related insurance costs may be stored for each trip and the funds may be transferred in a batch process (e.g., weekly, monthly, or the like the funds may be deducted from the premium or remaining balance of the premium. In some cases, insurance costs may be credited back to the account, such as when a driver meets predetermined threshold conditions that correspond with one or more driving activities (e.g., a hard braking event, hard cornering event, etc.) over time and/or distance traveled. For example, an insurance rate used to calculate at least a portion of the insurance costs may correspond to a number of driving events, such as hard braking events, hard cornering events, and/or the like for an accumulated distance traveled (e.g., 100 miles, 150 miles, 200 miles, etc.) by the vehicle.

The account module 212 may further include hardware and/or software configured to determine when a balance (e.g., premium balance) meets a predetermined threshold level. For instance, as the user operates the vehicle, the balance of the premium may be reduced on a per trip basis, daily, in a batch process, or the like (as discussed above). The system may identify a minimum threshold balance of the premium for the account. Once the account in the account module 212 reaches the minimum threshold balance, the system may notify the user. Notification to the user may be performed in various ways discussed herein. In addition, notification to the user may include modifying operation of the vehicle in order to provide an indication. That is, the system 200 may transmit a signal to the vehicle to modify operation of the vehicle as a notification to the user. Modifying operation of the vehicle may include causing the headlights to flash, causing the horn to beep, and/or preventing the vehicle from starting or operating.

Additionally or alternatively, the account module 212 may attempt to automatically replenish a balance in the account. That is, the system 200 may store payment account information for the user. The payment account information may include a credit card, bank account (e.g., checking account, savings account, etc.), or various other types of payment accounts. The payment account information may be stored in, for instance, the insurance database 206, policy module 204, or the like. The account module 212 may attempt to enact an automatic transfer of funds (e.g., electronic transfer of funds) from the payment account to the account in the account module 212. If successful, the account may be replenished and the coverage may remain in effect. If the attempt is not successful, the system may notify the user, make another attempt after a predetermined time has elapsed, or the like. In some examples, if one or more attempts to replenish the account are unsuccessful, the policy may be cancelled.

As discussed herein, various types of information may be displayed to the user via one or more computing devices, such as devices 214a-214f. For instance, a remaining balance of a premium, notifications as to a low balance, cost per day, cost per mile, trip data, patterns of driving behaviors, trends in trip costs, as well as policy information, user information, and the like, may be displayed to the user via one or more user interfaces generated by and/or provided via an application (e.g., an application downloaded or otherwise provided on the device 214a-214f). The devices may include a smartphone 214a, a personal digital assistant (PDA) a14b, a tablet 214c, a cell phone 214d, or other computing device 214e (e.g., a laptop computer, a desktop computer, etc.). In some examples, the information may be displayed to a user on a vehicle display 214f.

Figure 3:
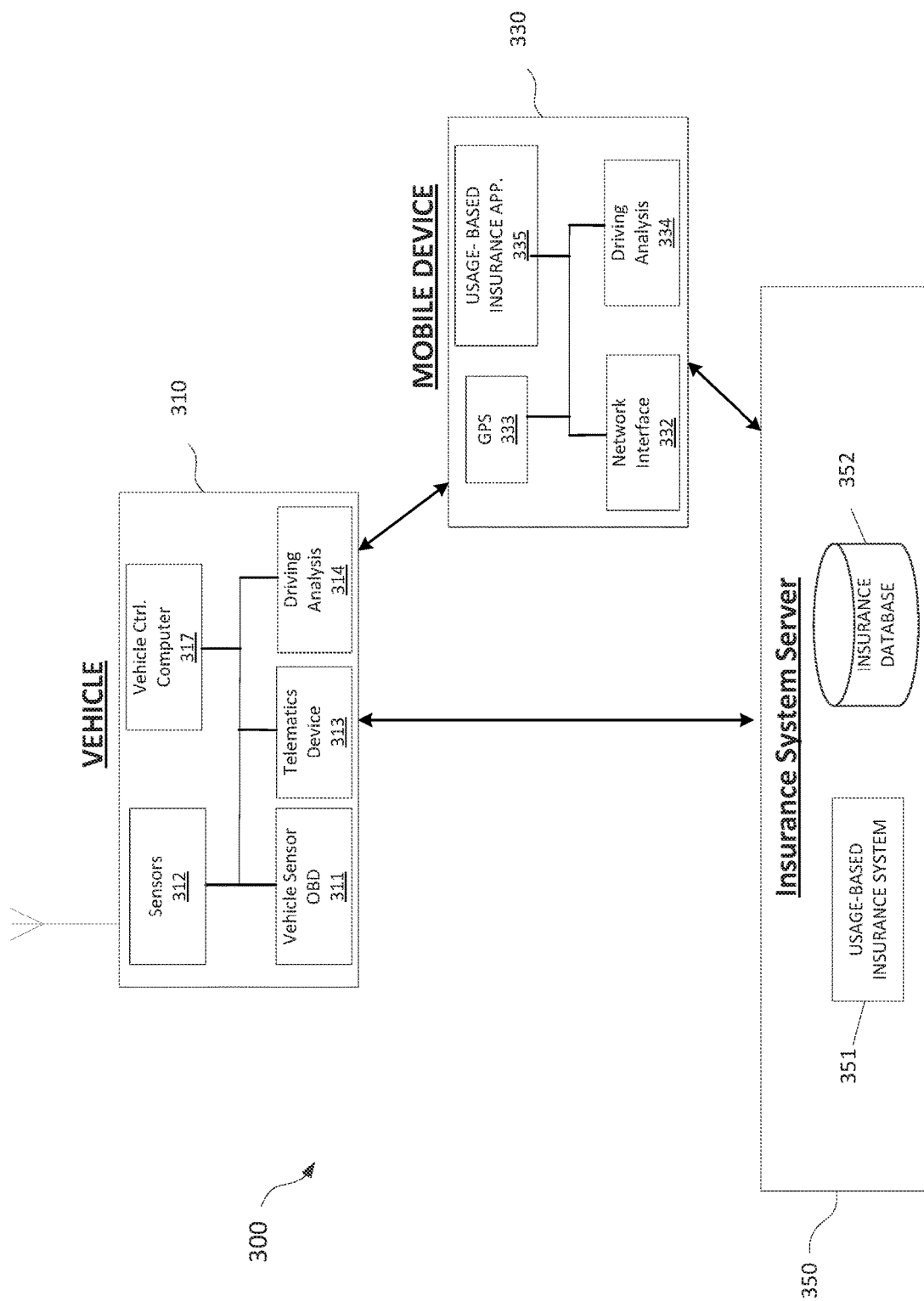
FIG. 3 shows an illustrative usage based insurance system environment illustrating various communications between vehicles-based devices, a personal mobile device, and an insurance system server, according to one or more aspects of the disclosure.

FIG. 3 shows a diagram of an illustrative driving analysis system 300 including additional aspects of the usage-based insurance system 200 shown in FIG. 2 and/or implementing the usage-based insurance system 200 of FIG. 2. The system may include a vehicle 310, a mobile device 330 (e.g., a personal mobile device), an insurance system server 350, and additional related components. As discussed below, the components of the system 300, individually or using communication and collaborative interaction, may determine, present, and implement various types of usage-based insurance to customers, including providing or facilitating purchase of a dynamic usage-based insurance policy and/or associated premiums and premium payments, determining various costs associated with the dynamic usage-based insurance policy (e.g., cost per day, cost per mile, etc.), analyzing driving data to modify costs associated with the dynamic usage-based insurance policy, communicating various information to the user (e.g., trip data, historical trends, and the like), etc. To perform such features, the configured components shown in FIG. 3 each may be implemented in hardware, software, or a combination of the two. Additionally, each component of the system 300 may include a computing device (or system) having some or all of the structural components described above for computing device 101.

In some cases, the vehicle 310 in the system 1100 may be, for example, an automobile, a motorcycle, a scooter, a bus, a recreational vehicle, a boat, an airplane, or other vehicle for which vehicle data, location data, driver data (or operator data), operational data and/or other driving data (e.g., location data, time data, weather data, etc.) may be collected and analyzed. The vehicle 310 includes vehicle operation sensor 311 (similar to one or more of the sensors 210a-210c of FIG. 2) capable of detecting and recording various conditions at the vehicle and operational parameters of the vehicle. For example, the sensor 311 may detect and store data corresponding to the vehicle's location (e.g., GPS coordinates), time, travel time, speed and direction, rates of acceleration or braking (e.g., hard braking), gas mileage, and specific instances of sudden acceleration, braking, swerving, and distance traveled. The sensor 311 also may detect and store data received from the vehicle's 310 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data that may be monitored and/or collected by the vehicle's computer systems (e.g., vehicle computer system 317), including the vehicle on-board diagnostic (OBD) systems.

In some cases, one or more additional sensors 312 may detect and store the external driving conditions, for example, external temperature, rain, snow, light levels, and sun position for driver visibility. For example, external cameras and proximity sensors 312 may detect other nearby vehicles, vehicle spacing, traffic levels, road conditions, traffic obstructions, animals, cyclists, pedestrians, and other conditions that may factor into a driving data/behavior analysis. The sensors 312 also may detect and store data relating to moving violations and the observance of traffic signals and signs by the vehicle 310. One or more of the sensors 311 and/or the additional sensors 312 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

In some cases, the vehicles sensors 311 and/or the additional sensors 312 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). The sensors 311 and/or the sensors 312 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. One or more of the sensors 311 and/or the sensors 312 also may be configured to collect data relating to a driver's movements or the condition of a driver. For example, vehicle 310 may include sensors that monitor a driver's movements, such as the driver's eye position and/or head position, etc. In some cases, the additional sensors 312 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

In some cases, certain vehicle sensors 311 and/or the additional sensors 312 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras of the sensors 311 and/or the additional sensors 312 may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by the vehicle sensor 311 may be stored and/or analyzed within the vehicle 310, such as, for example, a driving analysis computer 314 that may be integrated into the vehicle 310, the vehicle control computer 317, and/or the like, and/or the data collected by the vehicle sensor 311 may be transmitted to one or more external devices. For example, as shown in FIG. 3, sensor data may be transmitted analyzed by a telematics device and/or transmitted via the telematics device 313 to one or more remote computing devices, such as the mobile device 330, insurance system server 350, and/or other remote devices.

As shown in FIG. 3, the data collected by vehicle sensor 311 and or the sensors 312 may be transmitted to an insurance system server 350, mobile device 330, and/or additional external servers and devices via telematics device 313. The telematics device 313 may be one or more computing devices containing many or all of the hardware/software components as the computing device 101 depicted in FIG. 1. As discussed above, the telematics device 313 may receive vehicle operation data and driving data from the vehicle sensor 311 and/or the sensors 312, and may transmit the data to one or more external computer systems (e.g., insurance system server 350 of an insurance company, financial institution, or other entity) over a wireless transmission network. In some cases, the telematics device 313 may receive vehicle operation data and driving data from the vehicle sensor 311 and/or the sensors 312, and may transmit the data to the mobile device 330 via a wired communication link or a wireless communication link. In some cases, the mobile device 330 may locally process at least a portion of the received data. In some cases, the mobile device 330 may communication at least a portion of the received data and/or a portion of processed data to one or more external computer systems (e.g., insurance system server 350 of an insurance company, financial institution, or other entity) over a wireless transmission network. The telematics device 313 also may be configured to detect or determine additional types of data relating to real-time driving and the condition of the vehicle 310.

In the example shown in FIG. 3, the telematics device 313 may receive vehicle driving data from the vehicle sensor 311 and/or the sensors 312, and may transmit the data to the insurance system server 350. However, in other examples, one or more of the vehicle sensors 311, sensors 312 and/or sensor systems may be configured to receive and transmit data directly from or to the insurance system server 350 without using a telematics device. For instance, the telematics device 313 may be configured to receive and transmit data from certain vehicle sensors 311 sensors 312 and/or sensor systems, while other sensors or systems may be configured to directly receive and/or transmit data to the insurance system server 350 without using the telematics device 313. Thus, the telematics device 313 may be optional in certain embodiments. In other examples, as indicated above, the received sensor data may be analyzed by one or more computing devices within the vehicle, such as the driving analysis device 314 and/or the vehicle control computer 317.

In some cases, the telematics device 313 may be configured to be installed in the vehicle 310 and communicate to a remote device (e.g., the insurance system server 350) or a local device (e.g., the mobile device 330) via a communication link (e.g., a telecommunications network, the Internet, a WiFi network, a Bluetooth link, and/or the like). In some cases, the telematics device 313 may be integrated into another device, such as a vehicle computer system or the mobile device. In some cases, the telematics device 313 may be communicatively coupled to a computer system of the vehicle 310 via an OBD port (e.g., OBDI, OBD II, etc.) that may be located within the interior of the vehicle 310 and, in some cases, may be self-installed by a user.

In some cases, the telematics device 313 may (or may not) include a user display device for use in communicating information to a driver of the vehicle. In some cases, the telematics device 313 may not be capable of real-time communication with a user. The telematics device 313 may include one or more visual and/or audio indicators such as light emitting diodes (LEDs), audio speakers, and/or the like. In an illustrative example, the telematics device 313 may include a number (e.g., 1, 2, 3, etc.) colored LEDs to indicate wireless connectivity (e.g., a red LED), vehicle connectivity (e.g., a green LED), and data acquisition (e.g., an amber LED). These LEDs may be located on the telematics device 313 and may or may not be readily visible to a driver particularly in cases where the OBDII port is located on the underside of the vehicle's dashboard or other such hidden locations. The telematics device 313 may be unable to detect who is driving the vehicle. In some cases, the telematics device 313 may be configured to sense an indication of who is driving the car, such as by identifying a mobile device associated with the driver.

The telematics device 313 may contain one or more non-volatile memory devices and at least one processor. The telematics device 313 may include one or more communication devices (e.g., a CDMA modem, a Bluetooth transmitter, Wi-Fi transmitter, or any other wireless communication devices) for use in communicating with external devices. In some cases, the telematics device may include one or more modems operating on different wireless networks (e.g., a GSM network, a satellite network, etc.).

In some cases, the telematics device may include a location sensing system such as a GPS receiver that may be used to determine a location of the vehicle and/or the cardinal direction of vehicle travel. Additionally, the telematics device 313 may include one or more of a digital compass, a gyroscope, an angular rate sensor, a multi-axis accelerometer, a single axis accelerometer, an internal battery and/or the like. In some cases, the telematics device may be electrically coupled to the vehicle power system.

In some cases, the telematics device 313 may be configured to identify a time and/or date that may be used to identify a date of a trip, a time of day of at least a portion of the trip, and/or the like. The telematics device 313 may be configured to synchronize the time and/or date with an external network. In some cases, the telematics device may have the time and/or date set locally to the device. In an illustrative example, the telematics device may obtain the time of day through the communication interface (e.g., a CDMA modem) in the telematics device 313. The telematics device 313 may sense the location of the vehicle 310 at a predetermined frequency (e.g., 1 Hz, 2 Hz, 4 Hz, etc.) using a location sensing device (e.g., a GPS receiver) of the telematics device 313. In some cases, the telematics device 313 may sample one or more signals corresponding to the vehicle operation via the ODBDII port of a vehicle or other similar communication interface to the vehicle computer system 317. For example, the telematics device 313 may sample, the vehicle's speed at a predetermined rate (e.g., 1 Hz, 2 Hz, 4 Hz, etc.). In some cases, the telematics device 313 may obtain vehicle identification information such as the vehicle's vehicle identification number (VIN) and/or one or more supported parameter identifiers (PIDs) at a predetermined time, such as at the start of each trip. The telematics device 313 may record the collected data in non-volatile memory located in the device and process the data at the end of the trip. The telematics device 313 may or may not obtain other information from the vehicle through the OBDII port.

In some cases, the telematics device 313 may receive signals indicative of parameters that might define safe operating procedures, such as accelerometer and GPS data. In some cases, the telematics device may process instructions to calculate a velocity change value by integrating acceleration data. In some cases, the telematics device may calculate an acceleration value by taking a derivative of velocity data received via the OBDII port. In some cases, the telematics device 313 may receive current speed readings at predetermined intervals (e.g., one second, 500 millisecond, etc.) intervals through the OBDII port.

In some cases, the telematics device 313 may include an accelerometer and/or a three-axis accelerometer that may be used to measure acceleration data along one or more different axes at a predetermined frequency of (e.g., 1 Hz, 2 Hz, 4 Hz, etc.) and may record the sampled acceleration data in non-volatile memory within the telematics device 313. The non-volatile memory may be sized to hold operational information for a plurality of trips and/or an approximate number of hours (e.g., up to about 300 hours of collected driving data). Although the measurement frequency used by the telematics device 313 may be configurable, in some cases, (e.g., for particular parameters) the measurement frequency may be fixed (e.g., at 1 Hz, at 4 Hz, etc.). In some cases, acceleration data may be used to identify data indicative of steering and "roughness" of driving, such as lateral (i.e., right and left) acceleration, forward/backward acceleration, and up/down acceleration. In some cases, the telematics device 313 may be configured to measure one or more of the pitch, the roll, and/or the yaw of the vehicle.

In some cases, such as at the end of a trip, the telematics device may transmit the collected acceleration data, the velocity data, along with other collected data, to a remote computer system for processing. In some cases, the telematics device 313 may be configured to communicate at least a portion of the data collected during a trip to the mobile device 330 for processing. In some cases, the telematics device 313 may perform one or more computations on and/or analysis of the collected data. In some cases, at the end of a trip, the telematics device 313 may transmit all of the collected acceleration data, along with other collected data, in a proprietary binary format over a TCP/IP connection to a remote computer system. In some cases, the telematics device 313 may communicate the collected data in near real time for processing or at predetermined time (e.g., thirty second, one minute, 5 minute, etc.) intervals. The TCP/IP connection may be performed via a telecommunications network, a satellite communications network using the communication interface of the telematics device 313. In some cases, the telematics device 313 may communication information via a local wired or wireless communication link to the mobile device 330, which then may process the data or communicate the data to the insurance computer system 350 for processing. In an illustrative example, the transmitted data may be organized into predefined records and transmitted only at the end of a trip. In some cases, the predefined records are not transmitted at predetermined time or distance intervals during a trip, nor are they transmitted at random intervals. In other cases, the predefined records are transmitted at predetermined time or distance intervals during a trip, or in some cases, may be transmitted at random intervals.

In some cases, the telematics device 313 may be configured to identify a start or end of a trip. For example, the telematics device 313 may be configured to identify a start of a trip via location, acceleration and/or velocity data. In other cases, the telematics device 313 may not detect whether the vehicle is slowing down to a point where it is substantially stopped in order to determine the end of a trip. In such cases, the end of a trip may be detected when the vehicle's ignition is turned off.

In some cases, the insurance system server 350 may analyze the collected data to identify any "harsh" or sudden driving events (e.g., abrupt turning, hard braking, swerving, etc.) that may exceed a specified threshold (e.g., 8 miles per hour per second, 0.3 g, etc.) For each such driving event, the insurance system server 350 may record a window (e.g., 5 seconds, 6 seconds, 10 seconds, etc.) of speed and/or accelerometer data where a portion of the window is allocated to the time before the sudden driving event occurred and another portion of the time window is allocated to the time after the sudden driving event occurred. In some cases, the sudden driving events may be analyzed based on multiple thresholds (e.g., 8 miles per hour per second, 17 miles per hour per second, 0.3 g, 0.45 g, 0.6 g, etc.). In some cases, at least a portion of the above-mentioned data analysis may be performed in one or more different devices, such as the telematics device 313, the vehicle computer system 317, the mobile device 330 and/or the like.

In some cases, the telematics device 313 may be configured to process the data before communicating the data via a network to be analyzed. In such cases, the telematics device may be configured to perform one or more normalization calculations, where acceleration data, velocity data, distance data and the like may be normalized when sufficient data has been recorded, such as after a trip has been completed. For example, the telematics device may normalize acceleration data at the end of a trip (e.g., a first trip after installation of the telematics device 313 in the vehicle 310) such that the collected acceleration data may be normalized along the x, y, and z axes to account for a physical orientation of the telematics device 313 in the vehicle. The telematics device 313 may then store the normalized results in a file in a memory device and/or may communicate the normalized results to an external device such as the insurance system server 350 and/or the mobile device 330. In some cases, such as when the mobile device 330 may include acceleration sensors and/or may be communicatively coupled to additional sensors, captured acceleration information may be normalized more frequently (e.g., each trip, a specified duration of time, etc.) as the mobile device 330 may not be secured in a fixed or consistent orientation.

In some cases, the telematics device 313, the mobile device 330, and/or the insurance system server 350 may or may not transform the collected speed or acceleration data through different abstraction levels, such as to differentiate raw data from identified driving events and/or driving maneuvers. In some cases, one or more of the telematics device 313, the mobile device 330 and/or the insurance system server 350 may process captured driving information (e.g., a trip start time, a trip end time, acceleration information, velocity information, distance information, route information, and the like) to determine at least one or more of a total number of trips per day, a total amount of driving time per day or per trip segment, a total number of miles driven per day or trip segment, a total number of driving events per day or trip segment, an average speed per trip or trip segment, a maximum speed per trip or trip segment, and the like at a specified time, such as at the end of each trip In some cases, the telematics device 313 and/or the mobile device 330 may be configured to use a configuration file sent wirelessly from the remote insurance system server 350. While the configuration file may be used to indicate which data (e.g., speed, acceleration, distance, engine temperature, etc.) to monitor from the vehicle computer 317, the vehicle sensors 311, and/or the additional sensors 312, the configuration file may not indicate a memory location in the vehicle computer from which to read the data and/or which signals from the vehicle sensors 311 or the sensors 312 are to be read. The configuration file may indicate the timing of transmission of data from the telematics device 315 to the insurance system server 350. For example, the transmission timing may be preconfigured to store and forward data only at the end of a trip. In some cases, the transmission timing may be configured to communicate data at specified time intervals or distance intervals during a trip. In some cases, the configuration file may be configured to cause the telematics device 313 to wirelessly transmit data continuously (e.g., near real-time) or upon the occurrence of an event (e.g., an identified sudden driving event).

In some cases, the insurance system server 350 may transmit configuration information, or other such information, to the telematics device 313 and/or the mobile device 330 via a wireless communication link using one or more communication protocols (e.g. file transfer protocol (FTP)). For example, one or both of the telematics device 313 and/or the mobile device 330 may initiate a communication session (e.g., an FTP request) with the insurance system server 350 in response to a determination that an update has been requested by the insurance system server 350 (e.g., via an "update flag"). In response to the communication request, the insurance system server 350 may communicate the configuration file, including all or at least a portion of the configuration data, such as in response to a configuration data change. In some cases, the insurance system server 350 may communicate a firmware update and/or an application update to one or both of the telematics device 313 and/or the mobile device 330, such as by using the wireless communication link (e.g., FTP communication via a telecommunications network, etc.).

In some cases, the telematics device 313 and/or the mobile device 330 (e.g., an application running on the mobile device 330) may be configured to maintain a communication connection with the insurance system server 350. For example, the telematics device 313 and/or an application running on the mobile device 330 may be configured to maintain a regular (e.g., periodic) "heartbeat" with the insurance system server 350. In some cases, the telematics device 313 and the mobile device 330 may maintain a regular heartbeat signal in addition to or instead of the heartbeat communicated with the insurance system server 350. For example, the telematics device 330 may initiate the heartbeat signal in response to a successful installation process in the vehicle 310. Similarly, an application running on the mobile device may also initiate the heartbeat signal in response to a successful installation on the mobile device 330. The heartbeat signal may be communicated on a regular (e.g., periodic) basis (e.g., once per day, once per week, etc.). In an example, the heartbeat signal may be communicated once per day for a first week, but may then be communicated at a different rate (e.g., once per week) after the first week. In some cases, the telematics device 313, may monitor or otherwise check a voltage of the vehicle battery to confirm that the voltage is above a minimum threshold. In such cases, the telematics device 313 may activate a communication interface (e.g., the CDMA modem) and attempt to send an acknowledgment message to the insurance system server 350. When the vehicle battery voltage is found to be below the threshold, the telematics device 330 may alter the frequency at which it attempts to maintain the heartbeat signal to frequency less than daily until the low voltage issue is remedied. In some cases, the telematics device 330 may be configured such that an external device (e.g., the insurance system server 350 the mobile device 330, etc.) can ping the telematics device 330 to determine whether the telematics device 330 is operational, still installed, or whether the telematics device 330 has been uninstalled.

In some cases, the insurance system server may process information received from the telematics device 313 and/or the mobile device 330 to determine a dynamic usage based insurance cost. The insurance system server may communicate, via transmitted user interface screens, text messages, email messages, a web page, and/or the like, the calculated dynamic usage-based insurance costs. In such cases, the vehicle driver, or other insured person, may be notified of the usage-based insurance costs associated with the vehicle 310, and/or one or more different drivers of the vehicle 310. In some cases, the insurance system server 330, the telematics device 313 and/or the mobile device 330 may be configured to process algorithms to identify and void improper events from the information captured by the telematics device 313, the sensors 311, 312, and/or the vehicle computer system 317. In an illustrative example, when the vehicle 310 is attempting to exit a parking spot while stuck in snow, the telematics device 313 may capture information that may be interpreted as a hard acceleration event and/or a hard braking event that may negatively impact the insurance costs. Such algorithms may be used to identify and/or remove such events from the insurance cost calculations such that the usage based insurance costs are not negatively affected.

The system 300 in FIG. 3 also includes a mobile device 330. Mobile devices 330 may be, for example, smartphones or other mobile phones, personal digital assistants (PDAs), tablet computers, laptop computers and the like, and may include some or all of the elements described above with respect to the computing device 101 and/or the telematics device 313. As shown in this example, some mobile devices in the system 300 (e.g., mobile device 330) may be configured to establish communication sessions with vehicle-based devices and various internal components of vehicle 310 via wireless networks or wired connections (e.g., for docked devices), whereby such mobile devices 330 may have secure access to the internal vehicle sensors 311, the additional sensors 312, and/or other vehicle-based systems. However, in other examples, the mobile device 330 might not connect to vehicle-based computing devices and/or internal components, but may operate independently by communicating with the vehicle 310 via their standard communication interfaces (e.g., telematics device 313, etc.), or might not directly connect at all to vehicle 310.

The mobile device 330 may include a network interface 321, which may include various network interface hardware (e.g., adapters, modems, wireless transceivers, etc.) and software components to enable the mobile device 330 to communicate with the insurance system server 350, the vehicle 310, and/or various other external computing devices. One or more specialized software applications, such as a driving analysis application 334 and/or a usage-based insurance application 335 and/or the like may be stored in the memory of the mobile device 330 (e.g., may be downloaded or otherwise provided to the device and stored). The driving analysis application 334 and/or the usage-based insurance application 335 may be received via the network interface 321 from the insurance server 350, the vehicle 310, or other application providers (e.g., application stores). As discussed below, the driving analysis application 334 and the usage based insurance application 335 may or may not include various user interface screens, and may be configured to run as user-initiated applications or as background applications. In some cases, the driving analysis application 334 and the usage based insurance application 335 may be configured to receive a user interface screen from a remote device (e.g., a server at an entity 101) to display information received via the network on a display device. The memory of the mobile device 330 also may include databases configured to receive and store vehicle data, driving data, driving trip data, and the like, associated with one or more drivers and/or vehicles.

Like the vehicle-based computing devices in vehicle 310, mobile device 330 also may include various components configured to generate and/or receive vehicle data, driver data, and driving data or other operational data. For example, using data from the GPS receiver 333, a driving analysis software application 334 may be able to identify starting and stopping points of driving trips, determine driving speeds, times, routes, and the like. Additional components of mobile device 330 may be used to generate or receive driving data for the driving data analysis application 334 and/or usage-based insurance application 335, such as an accelerometer, compass, and various cameras and proximity sensors. As discussed below, these and other mobile device components may be used to receive, store, and output various user/driver data, to identify starting and stopping points and other characteristics of driving trips, to determine various driving data such as speeds, driving routes and times, acceleration, braking, and turning data, and other driving conditions and behaviors. In some implementations, the driving analysis software application 334 may store and analyze the data from various mobile device components, and the usage-based insurance application 335 may use this data, alone or in any combination with other components or devices (e.g., insurance server 350), to determine and present insurance offers, insurance costs (e.g., cost per day, cost per mile, revised cost per day, revised cost per mile, etc.), and the like.

When mobile computing devices within vehicles are used to detect vehicle driving data and/or to receive vehicle driving data from vehicle sensors, such mobile computing devices 330 may store, analyze, and/or transmit the vehicle driver data (e.g., data identifying a current driver), driving data (e.g., speed data, acceleration, braking, and turning data, and any other vehicle sensor or operational data), and driving trip data (e.g., driving route, driving times, driving destinations, etc.), to one or more other devices. For example, mobile computing device 330 may transmit driver data, driving data and driving behaviors, and driving trip data directly to one or more insurance servers 350, and thus may be used in conjunction with or instead of telematics devices 313. Moreover, the processing components of the mobile computing device 330 may be used to identify vehicle drivers and passengers, analyze vehicle driving data, analyze driving trips, determine parameters related to aspects of usage based insurance policies, and perform other related functions. Therefore, in certain embodiments, mobile computing device 330 may be used in conjunction with, or in place of, the insurance system server 350.

Vehicle 310 may include driving analysis computer 314, which may be separate computing devices or may be integrated into one or more other components within the vehicle 310, such as the telematics device 313, autonomous driving systems, or the internal computing systems 317 of vehicle 310. As discussed above, driving analysis computers 314 also may be implemented by computing devices independent from the vehicle 310, such as mobile computing device 330 of the drivers or passengers, or one or more separate computer systems (e.g., a user's home or office computer). In any of these examples, the driving analysis computer 314 may contain some or all of the hardware/software components as the computing device 101 depicted in FIG. 1. Further, in certain implementations, the functionality of the driving analysis computers, such as storing and analyzing driver data, vehicle data, driving data and driving behaviors, and determining, presenting, and implementing aspects of usage-based insurance polies, may be performed in a central insurance system server 350 rather than by the individual vehicle 310 or personal mobile device 330. In such implementations, the vehicle 310 and and/or mobile device 330, might only collect and transmit driver data, vehicle data, driving data, and the like to an insurance server 350, and thus the vehicle-based driving analysis computer 314 may be optional.

The system 300 also may include one or more insurance system servers 350, containing some or all of the hardware/software components as the computing device 101 depicted in FIG. 1. The insurance system server 350 may include hardware, software, and network components to receive driver data, vehicle data, and vehicle operational data/driving data from one or more vehicles 310, mobile devices 330, and other data sources. The insurance system server 350 may include an insurance database 352 and usage-based insurance system 351 to respectively store and analyze driver data, vehicle data, and driving data, etc., received from vehicle 310, mobile device 330, and other data sources. In some examples, the usage-based insurance system 351 may include many or all of the components of usage-based insurance system 200 described with respect to FIG. 2.

The insurance system server 350 may initiate communication with and/or retrieve driver data, vehicle data, and driving data from vehicle 310 wirelessly via telematics device 313, mobile device 330, or by way of separate computing systems over one or more computer networks (e.g., the Internet). Additionally, the insurance system server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the insurance database 352 may be organized in any of several different manners. For example, a driver table in database 352 may contain all of the driver data for drivers associated with the insurance provider (e.g., driver personal information, insurance account information, demographic information, accident histories, risk factors, driving scores and driving logs, etc.), a vehicle table may contain all of the vehicle data for vehicles associated with the insurance provider (e.g., vehicle identifiers, makes, models, years, accident histories, maintenance histories, travel logs, estimated repair costs and overall values, etc.), and a driving trip table may store all of the driving trip data for drivers and vehicles associated with the insurance provider (e.g., driving trip driver, vehicle driven, trip time, starting and ending points, route driven, etc.). Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The usage-based insurance system 351 within the insurance system server 350 may be configured to retrieve data from the database 352, or may receive driver data, vehicle data, and driving trip directly from vehicle 310, mobile device 330, or other data sources, and may perform driving data analyses, determine insurance parameters for usage-based insurance policies, and other related functions. The functions performed by the usage-based insurance analysis system 351 may be performed by specialized hardware and/or software separate from the additional functionality of the insurance system server 350. Such functions may be similar to those of driving analysis module 314 of vehicle 310, and the driving analysis and usage-based insurance applications 334 and 335 of mobile device 330, and further descriptions and examples of the algorithms, functions, and analyses that may be executed by the usage-based insurance system 351 are described more fully below.

Figure 4:
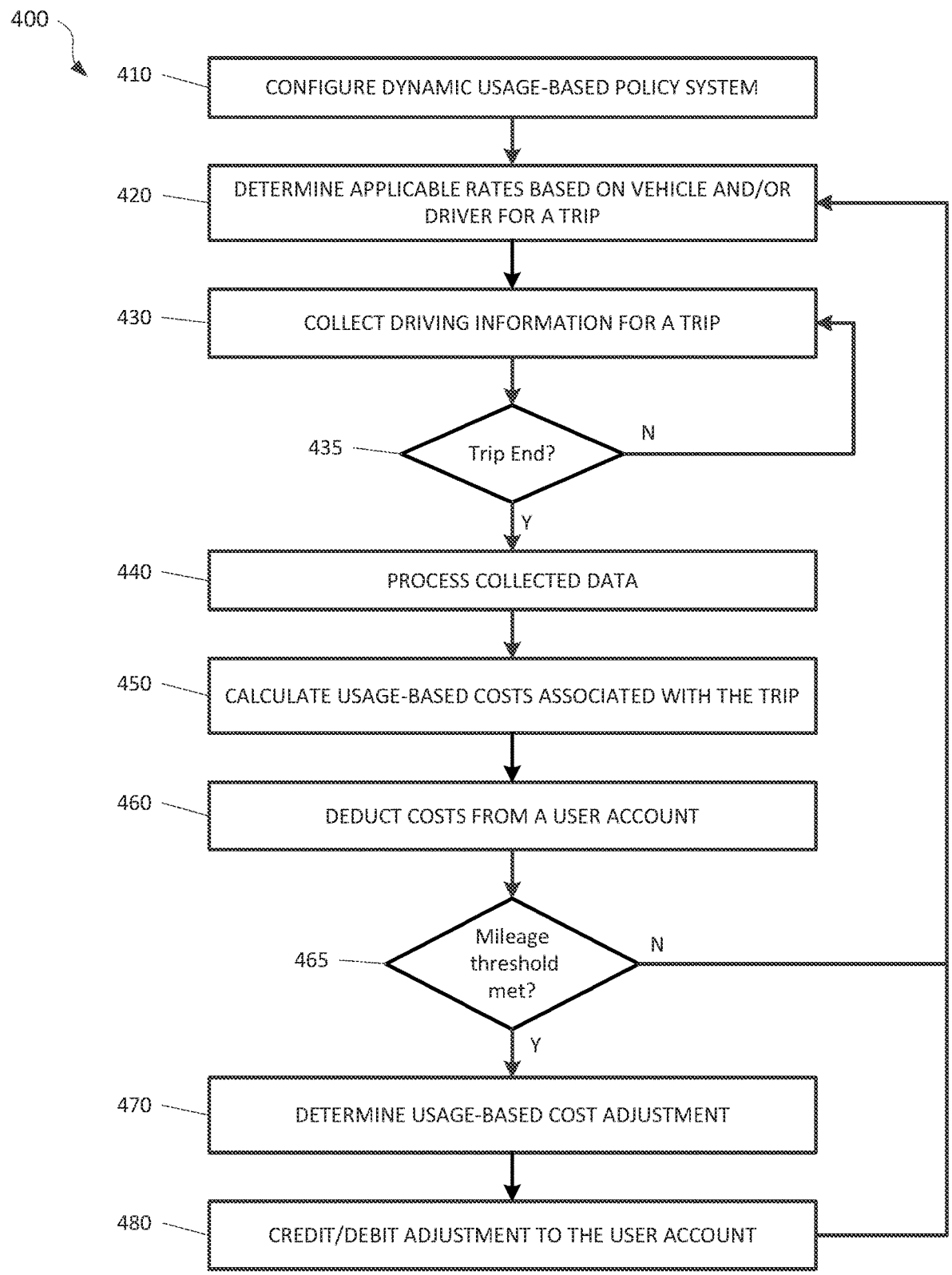
FIG. 4 shows an illustrative flow diagram showing a method of determining an insurance cost associated with a trip for a usage-based insurance policy and deducting the cost of the trip from an account associated with the policy according to one or more aspects described herein.

FIG. 4 shows an illustrative flow diagram showing a method 400 of determining an insurance cost associated with a trip for a usage-based insurance policy and deducting the cost of the trip from an account associated with the policy according to one or more aspects described herein. It should be noted that although various steps of the process are shown in order in FIG. 4, one or more steps of the process may be performed in a different order, or not performed, without departing from the invention.

At 410, a system for providing a dynamic usage-based insurance policy may be configured to provide one or more elements of usage-based insurance and one or more elements of "standard" insurance (e.g., insurance in which a user pays a premium based on one or more traditional insurance factors in which a user pays a fixed premium for a specified term) for one or more drivers of a vehicle 310. Configuration of an illustrative dynamic usage-based insurance system may include installing and/or configuring one or more hardware devices that may be associated with the vehicle (e.g., the telematics device 313, the vehicle sensors 311, the additional sensors 312), the driver (e.g., the mobile device 330) and/or the entity 201 (e.g., the insurance system server 350) to collect information corresponding to a plurality of trips made by an insured user in the vehicle 330 and to analyze the information (e.g., by the telematics device 330, the mobile device 330, the insurance system server 350, etc.) in determining costs associated with insuring the vehicle based on both a standard daily rate and a dynamically calculated usage-based rate. Configuration of the hardware and/or software may include configuring the telematics device 313 for communication to one or more sensors (e.g., the sensors 311, the sensors 312, etc.), to the vehicle computer system 317 (e.g., via an OBDII port, etc.), to a mobile device 330, and/or to the insurance system server 350, as discussed above. In some cases, the telematics device 313 may be a stand-alone device communicatively coupled to the vehicle computer system 317 via a wired (e.g., the OBDII port of the vehicle, etc.) or wireless (e.g., WiFi, Bluetooth, etc.) communication link. In some cases, the mobile device 330 may include, or be configured to operate as, the telematics device 313. In such cases, the mobile device 330 may be installed within the vehicle at a fixed location (e.g., a smart-phone cradle, etc.) or may be located at any user desired location within the vehicle. In such cases, the mobile device 330 may include a communication interface and/or application software configured to operate as the telematics device 313.

In some cases, configuration of the illustrative dynamic usage-based insurance system may include receiving a premium amount for an insurance policy, such as at an account associated with a user (e.g., a driver, an owner, etc.) of the vehicle. In some cases, the premium (e.g., an amount of funds) may be stored in an account associated with the user (e.g., a driver, a vehicle owner, etc.) or vehicle and held by the entity (e.g., insurance provider). The funds may be held in the account until a portion of the premium funds are used (e.g., based on operation of the vehicle). At that time, e.g., in near real-time, (or in a batch process) the cost of one or more trips may be deducted from the premium and may be electronically transferred from the user account to another account of the entity.

At 420, the insurance server system 350 may determine one or more rates used in calculating a cost of insurance for a vehicle. For instance, the insurance server system 350 may be configured to generate and/or store dynamic usage based insurance policies applicable rates, as well as insurance policy information or factors, such as vehicle information, driving record/experience, policy limits, deductibles, etc. That is, a user may be insured through a policy that insurance coverage for a particular cost per day of the insured term (e.g., a daily insurance premium) and a cost per mile traveled by the insured vehicle (e.g., a mileage based insurance premium). In an illustrative example, the insurance system server 350 may be configured to calculate costs associated with a dynamic usage-based insurance plan according the following formula:

$$C_{Total} = \Sigma C_{Day} + \Sigma C_{Mile} \quad (1)$$

where:

$C_{Total}$=a total cost of the dynamic usage-based insurance policy over the insured time period (e.g., about 6 months, about 1 year, etc.);

$C_{Day}$=a sum of the cost per day for each day of the insured time period; and $C_{Mile}$=a sum of the cost per mile for the distance traveled by the vehicle over the insured time period.

The cost per day of the time period may correspond to sum total of daily insurance rates (e.g., a daily premium) for each day of the insured time period. These daily insurance rates may be calculated by the insurance system server 350 at, or before, the insured time period begins and may remain constant for each day of the insured time period. In some cases, the one or more daily insurance rates may be re-calculated one or more times during the insured time period. The insurance system server 350 may calculate the daily insurance rate based, at least in part, on one or more vehicle parameters (such as year, make, model, features, specifications, etc.), condition or performance of the vehicle (e.g., based on sensor data), and the like, as well as traditional policy factors, such as driving experience, driving record, credit variables, policy coverage, deductible, policy limits, familiarity of the driver with the vehicle or surroundings, driving history, accident history, location, credit rating, and various other factors associated with one or more users of the vehicle.

The cost per mile for the time period may be calculated based on a usage-based insurance rate (e.g., a usage based premium, etc.) that may be calculated by the insurance system server 350 based on, based on driving habits of the user, environmental conditions in which the user operates the vehicle, vehicle parameters (such as year, make, model, features, specifications, etc.), condition or performance of the vehicle (e.g., based on sensor data), and the like, as well as traditional policy factors, such as driving experience, driving record, credit variables, policy coverage, deductible, policy limits, familiarity of the driver with the vehicle or surroundings, driving history, accident history, location, credit rating, and various other factors associated with one or more users of the vehicle. In an illustrative example, one or more usage-based insurance rates may be calculated by the insurance system server 350 based on a number of factors including, but not limited to, to a time of day, a road type being traveled, whether a threshold number of hard-braking events occurred and/or whether a threshold number of hard-cornering events occurred, and/or the like.

In some cases, the calculated insurance rates may also depend on a level of coverage elected by the user or owner of the vehicle 310. For example, a policy parameter may include a level of coverage. The insurance system server, may calculate a first rate for a user who elected a first level of coverage and a second rate for a user who elected a second level of coverage, where the first rate is different than the second rate. For instance, usage based insurance rates may be calculated at various levels with each level providing a different level of coverage and associated rate. Additionally or alternatively, different calculated mileage rates may reflect different levels of coverage.

As discussed, the cost per mile of the insurance coverage may be calculated by the insurance system server 350 using one or more calculated rates, as applicable, based on the vehicle driven, the driver of the vehicle, one or more driving conditions, and/or whether a threshold number of driving events have been experienced while driving.

At 420, one or more rates used to determine cost per day, $R_{Day}$, and/or a rate used to determine cost per mile, $R_{Mile}$, associated with the policy may be determined based on a variety of factors. In an illustrative example, the cost per day and/or cost per mile may be determined based on rates determined using various factors such as those discussed above. These costs or rates may be used to determine a cost of insuring a vehicle during a driving trip. For instance equation (1) may be rewritten as:

$$C_{Total} = \sum_{d=1}^{n} R_d + \sum_{s=1}^{m} R_s \quad (2)$$

where $$\sum_{d=1}^{n} R_d$$

corresponds to a sum of each daily rate over the insured time period and $$\sum_{s=1}^{m} R_s$$

corresponds to a sum of the mileage rates for each segment, s, (e.g., 0.1 miles, etc.) of distance traveled by the vehicle over the insured time period.

In some cases, one or more rates used in determining the cost per mile portion of the dynamic usage based insurance costs may be based on a number (e.g., 4, etc.) real-time telematics-like factors. These telematics-like factors may be used to calculate the per segment rates according to an actual use of the vehicle 310. In an illustrative example, the each rate used in determining the cost per mile portion of the dynamic usage-based insurance costs may be based on factors including: (1) night-time driving vs. day time driving, (2) highway driving vs. non-highway driving, (3) whether a threshold number of sudden braking events has been met, and/or (4) whether a threshold number of abrupt turns has been met. In some cases, the cost per mile insurance costs may be calculated for each trip segment (e.g., 0.1 mile, etc.)

In an illustrative example, a relationship between per day insurance rates associated with night time driving $R_{Night}$ may be a multiple of the rate associated with daytime driving, $R_{Day}$:

$$R_{Night}=3*R_{Day} \quad (3)$$

In some cases, the hours associated with day and night may be fixed, such as with nighttime driving being defined as being between 9 PM and 5 AM local time regardless of the day of the year and/or the latitude of the vehicle location. In other cases, the day/night determination may analyze latitude, day of the year, weather conditions that may reduce visibility (e.g., cloud cover, precipitation, etc.) to determine times associated with daytime driving and/or nighttime driving.

A rate associated with highway driving ($R_{HWY}$) may be less than the costs associated with non-highway driving ($R_{NonHWY}$) and may be determined according to the following relationship:

$$R_{NonHWY}=2*R_{HWY} \quad (4)$$

In some cases, a rate corresponding to whether or not a threshold number of hard braking events has occurred over a specified distance traveled by the user (e.g., 150 miles). For example, a rate corresponding to a number of hard braking events equal to or greater than the threshold ($R_{2+HB}$) may be 5 times greater than the rate corresponding to a number of hard braking events less than the threshold of 2 hard braking event ($R_{0\_1HB}$). Incidence of hard braking $$R_{2+HB}=5*R_{0\_1HB} \quad (5)$$

In some cases, a rate corresponding to whether or not a threshold number of hard cornering events has occurred over a specified distance traveled by the user (e.g., 150 miles). For example, a rate corresponding to a number of hard cornering events equal to or greater than the threshold ($R_{1+HC}$) may be 2.5 times greater than the rate corresponding to a number of hard braking events less than the threshold of 1 hard cornering event ($R_{0HC}$).

$$R_{1+HC}=2.5*R_{0HC} \quad (6)$$

In some cases the insurance system server 350 may be configured to generate one or more tables corresponding to one or more rates that may be used in calculating a mileage based portion of an insurance premium. For example, a daily insurance rate that may be charged to the owner of the dynamic usage based insurance policy may be written as:

$$R = Rday + + \sum_{s=1}^{m} R_s \quad (7)$$

Rs corresponds to the rate per segment of distance traveled that may be chosen based on the factors discussed above, such as whether the road segment was driven during the day or during the night, whether the road type was highway or non-highway, whether the threshold number of hard cornering events had been met, and/or whether the threshold number of hard braking events had been met. In some cases, the insurance system server may calculate a rate based on the different conditions and populate one or more lookup tables that may be used when determining an insurance cost for a trip traveled in the vehicle. In some cases, the rate for a particular segment may be determined using similar to the following tables. In some cases, the rates may be calculated as constant values. In some cases, rates may be stored as equations based on one or more factors that may be met during a trip.

TABLE 1

Rates dependent on time of day and road type.

|  | Highway | Non-Highway |
| --- | --- | --- |
| Day | R1 | R2 |
| Night | R3 | R4 |

TABLE 2

Rates for whether particular driving event thresholds have been met.

|  | No Hard Braking | Hard Braking |
| --- | --- | --- |
| No Hard Cornering | R5 | R6 |
| Hard Cornering | R7 | R8 |

At 430, driving trip data may be received by the telematics device 313 for a first driving trip. The driving trip data may be received from one or more sensors (e.g., sensors 210a-210c, sensors 311, sensors 312, etc.) associated with the system and may be received by, or otherwise communicated to, for instance, the usage cost module 202. The driving trip data may include data associated with start time of the first driving trip, end time of the first driving trip, duration of driving, distance driven, location, braking, turning, acceleration, deceleration, and the like. Additionally, contextual or environmental information (e.g. from sensors 210a-210c, sensors 311, sensors 312 and/or locality database 208) associated with the first driving trip may be received. Contextual or environmental information may include time of day, weather conditions, precipitation conditions, traffic volumes, and the like. In some examples, the driving trip data may include the contextual or environmental information.

At 435, driving data may be analyzed to determine whether a trip has ended, such as by identifying that the engine of the vehicle has been turned off, determining whether a predetermined destination has been reached, determining whether the vehicle has been stopped for a particular length of time, and/or the like. If the trip has not ended, the telematics device 313 and/or the mobile device 330 may continue to collect driving information at 430. If, however, the trip has been determined to have ended at 435, the collected data may be processed.

At 440, the collected driving data may be processed locally to the vehicle 310 by the telematics device 313 and/or the mobile device 330. In other cases, the collected driving data may be communicated to a remote location, such as the insurance server system 350 for processing. In such cases, the collected driving data associated with the trip may be communicated as a whole to the insurance server system 350. In processing the data, a portion of the collected driving information may be normalized and/or filtered to remove false or misleading data and/or to remove outliers that may cause errors in calculating a daily rate. In some cases, the driving data may be organized by each segment of the trip, such that a time of day and/or a road type can be determined for each segment.

Additionally, the acceleration, velocity and/or location data may be analyzed to determine whether a driving event (e.g., the hard cornering event, the hard braking event, etc.) has occurred during the trip. If so, the driving event is logged to a particular trip and a counter associated with the appropriate driving event type may be incremented.

At 450, the insurance system server 350 may determine a determine a cost per mile of the driving trip based on the previously determined rates and the collected driving data. For instance, the system may determine the cost of the first driving trip based on, for example, the cost per day and the cost per mile determined above. This information may be used in conjunction with the distance and time of the trip to determine a cost of the first trip. In some cases, in calculating the cost associated with the driving trip, a rate associated with the hard braking and/or hard cornering events may not be known due to the trip being less than the predetermined number of miles (e.g., 150 miles). In such cases, the cost of the trip may be calculated using an estimated rate associated with these driving events. In some cases, long trips may be capped at a predetermined number of miles (e.g., 150 miles). For example, the costs may be calculated under the assumption that the threshold values may likely be exceeded so that a maximum rate may be used in calculating the costs. In other cases, the opposite assumption may be made that the threshold values are likely not to be exceeded and a minimum rate may be used. Other such methods of estimating a rate may be used (e.g., a rate of 0, etc.). In an illustrative example, the cost per mile rate for each segment of the driving trip may be calculated as $Rs = R_{road\_type} + R_{time\_of\_day} + \max(R_{hard\_cornering}) + \max(R_{hard\_braking})$.

In step 460, this cost of the first trip may then be deducted from the premium provided by the user and stored in the account module. For instance, a balance of the premium in the account may be reduced by the cost of the trip.

At 465, an accumulated total of miles traveled may be analyzed by the insurance system server 330 to determine whether a predetermined mileage threshold has been met. For example, in processing the collected driving data, the distance of each trip may be added and stored in a memory device (e.g., an accumulator), such that a determination may be made as to whether the predetermined mileage threshold (e.g., 150 miles) has been met. In cases where a portion of a driving trip may be included in each of adjacent 150 mile segments, the driving trip and any associated driving events may be included in the calculations for both of the adjacent segments. If not, the insurance system server 350 may determine whether one or more rates may be updated in preparation of a next trip of the vehicle. If, however, the threshold has been met, the insurance system server 350 may compare the total number of each driving event type to the associated threshold value to determine a rate that is to be charged based on the determination at 470. For example, if one or less hard braking events and/or no hard cornering events were experienced over the accumulated trip mileage, a credit may be calculated and applied to the user account based on the determination at 480. Similarly, if two or more hard braking events and/or one or more hard cornering events were experienced over the accumulated trip mileage, a debit may be calculated and applied to the user account based on the determination at 480. Once the appropriate credit or debit has been applied, the process may return to step 420 to calculate applicable rates for a vehicle and/or driver in relation to a next driving trip.

Figure 5:
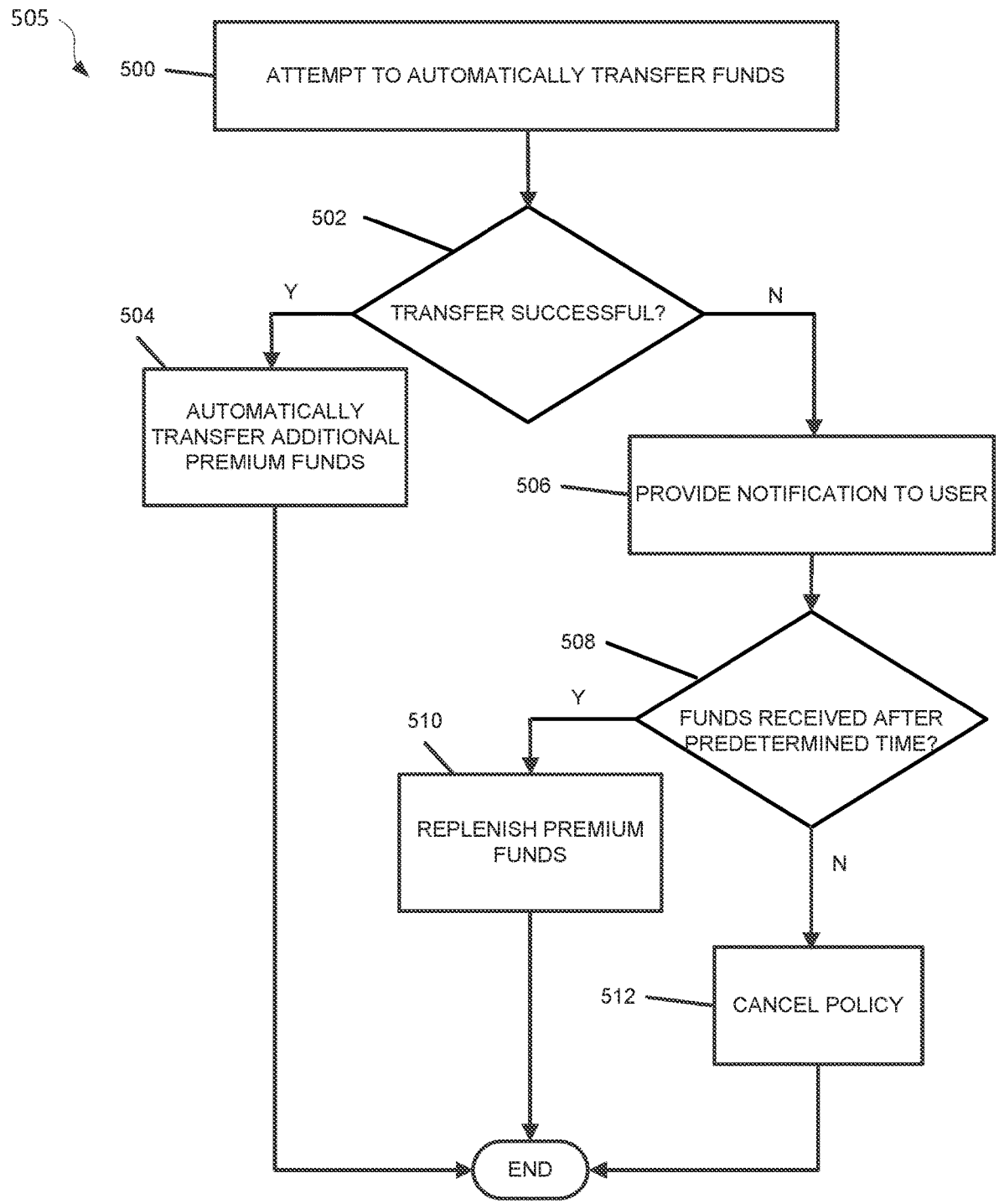
FIG. 5 illustrates an illustrative method of attempting to automatically transfer funds from a payment account to a user or vehicle account according to one or more examples discussed herein.

FIG. 5 illustrates an illustrative method 505 of attempting to automatically transfer funds from a payment account to a user or vehicle account according to one or more examples discussed herein. For instance, the process shown in FIG. 5 may occur simultaneously with or immediately following step 460, in some cases.

In step 500, the system may attempt to automatically transfer funds from the identified payment account of the user to the user account stored in the account module. This process may, in some examples, be performed by the account module. In step 502, a determination may be made as to whether the attempted transfer was successful. For instance, the system may determine whether there were sufficient funds in the payment account, whether a credit card number provided was still valid, etc. If the attempted transfer was successful, the funds may be transferred from the payment account to the user account in step 504.

If, in step 502, the attempted transfer was not successful, a notification may be provided to the user in step 506. As discussed herein, providing a notification may include displaying an indication to the user (e.g., on a display of the on-board vehicle computing device, on a mobile device of the user, or the like) indicating that the user's account balance is below the threshold, that an attempt to replenish the account was made and was not successful. In some examples, providing a notification may include modifying operation of the vehicle. For instance, the system may provide an instruction or signal to, for instance, the vehicle control computer 317, to modify operation of the vehicle or one or more systems of the vehicle. For instance, the instruction may include causing the vehicle to flash the headlights, engage the horn, and/or may prevent the vehicle from starting or operating in a normal fashion.

In step 508, a determination may be made as to whether, after a predetermined time, the desired funds were received by the user account. For instance, the system may wait a predetermined time, such as one day, three days, one week, or the like and may make another attempt to transfer the funds or may review the balance of the account to determine whether funds were deposited (e.g., determine whether the premium balance is still below the threshold). If the funds have been received in step 508, the transfer may be completed and/or the premium balance may be replenished (e.g., increased above the predetermined threshold).

If, in step 508, the funds have not been received or any additional attempts to transfer the funds are not successful, the insurance policy may be cancelled in step 512.

Figure 6:
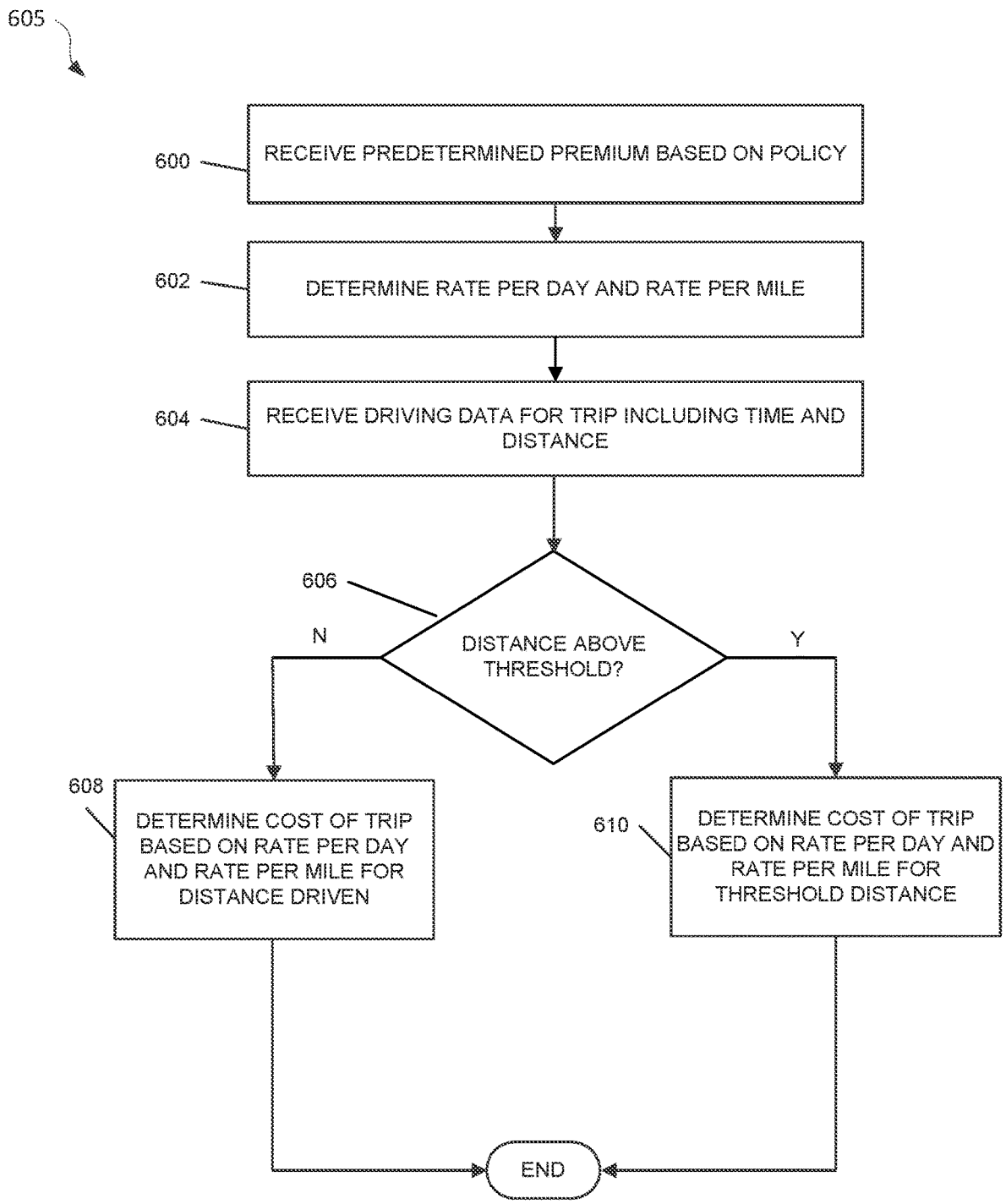
FIG. 6 illustrates an illustrative method of reducing or eliminating charges upon reaching a daily mileage threshold limit, according to one or more aspects described herein.

FIG. 6 illustrates an illustrative method 605 of reducing or eliminating charges upon reaching a daily mileage threshold limit, according to one or more aspects described herein. In step 600, a premium may be received for a usage-based insurance policy. In step 602, a cost or rate per day and/or a cost or rate per mile may be determined based on one or more factors. The cost per day and/or cost per mile may be an initial or first cost per day or cost per mile, or may be a revised cost per day or cost per mile, as discussed above, and therefore may be based on various factors, as discussed herein.

In step 604, driving data for a trip may be received. Driving data, as discussed above, may include duration, distance, location, driving behavior data, contextual or environmental data, and the like. In step 606, a determination is made as to whether a distance driven in the trip is above a predetermined threshold. For instance, a user may have a policy that provides that any miles driven over a predetermined threshold number of miles in a day (e.g., 100, 75, 150, or the like) may be driven free of charge (e.g., without a cost being deducted from the premium for miles over the threshold). Accordingly, if the number of miles for the trip is determined to be below the threshold in step 606, then the system may determine a cost of the trip based on the cost per day and/or cost per mile and the total distance driven in step 608. Alternatively, if the distance driven is above the threshold in step 606, then in step 610, the cost for the trip will be determined based on the cost per day and/or the cost per mile and the threshold distance.

Figure 7:
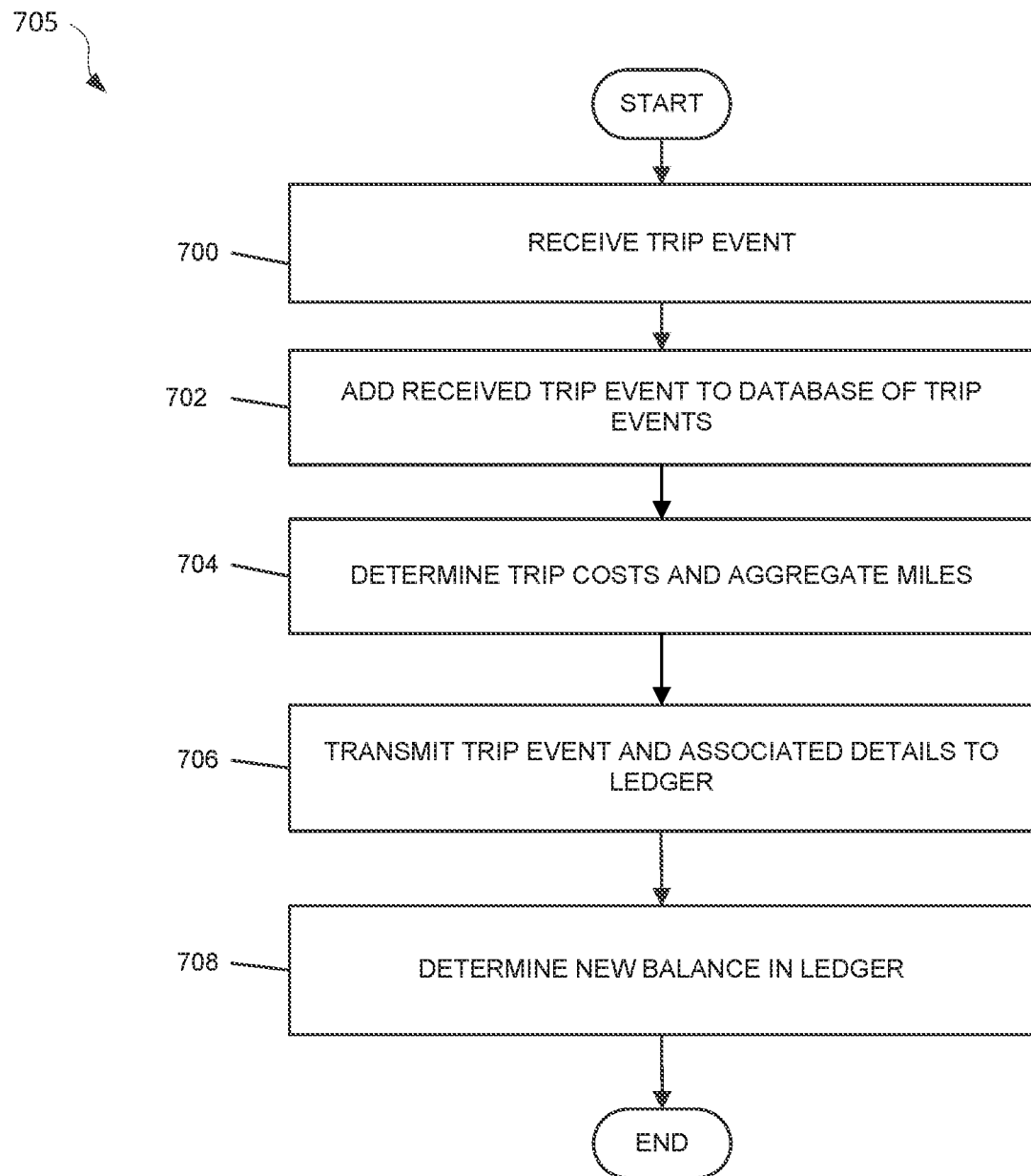
FIG. 7 shows an illustrative method of tracking trip events via a ledger according to one or more aspects described herein.

FIG. 7 shows an illustrative method 705 of tracking trip events via an electronic ledger according to one or more aspects described herein. In step 700, a trip event may be received. A trip event may include an occurrence of driving a vehicle, such as from a source location to a destination, a hard braking event, a hard cornering event and/or the like. In step 702, the trip event may be added to a database of trip events. For instance, the trip event may be added to a database storing historical driving data, such as within usage cost module 202, or within insurance database 206.

In step 704, trip cost and aggregate miles may be determined. That is, the usage cost module 202 may determine a cost associated with the trip based on, for example, a number of miles, a duration of the trip, and the like. The cost per day and/or cost per mile may be determined, as well as an aggregate number of miles travelled. In step 706, the trip event and associated details (e.g., costs, aggregate miles, and the like) may be transmitted to a ledger stored within account module 212. The ledger may store and/or track an account balance for a user, trip events, trip costs, aggregate miles, and the like.

In step 708, the account module 212 may determine a new balance in the ledger for the account based on the data received. For instance, a cost of the trip event may be deducted from a previous account balance stored in the ledger to determine a new balance. In one example in which a cost per day is used as a charge for the usage-based insurance policy, the balance in the ledger for a policy may be reduced by the determined rate per day for each vehicle associated with the policy (rate per day may vary based on a selected coverage for a vehicle).

Figure 8:
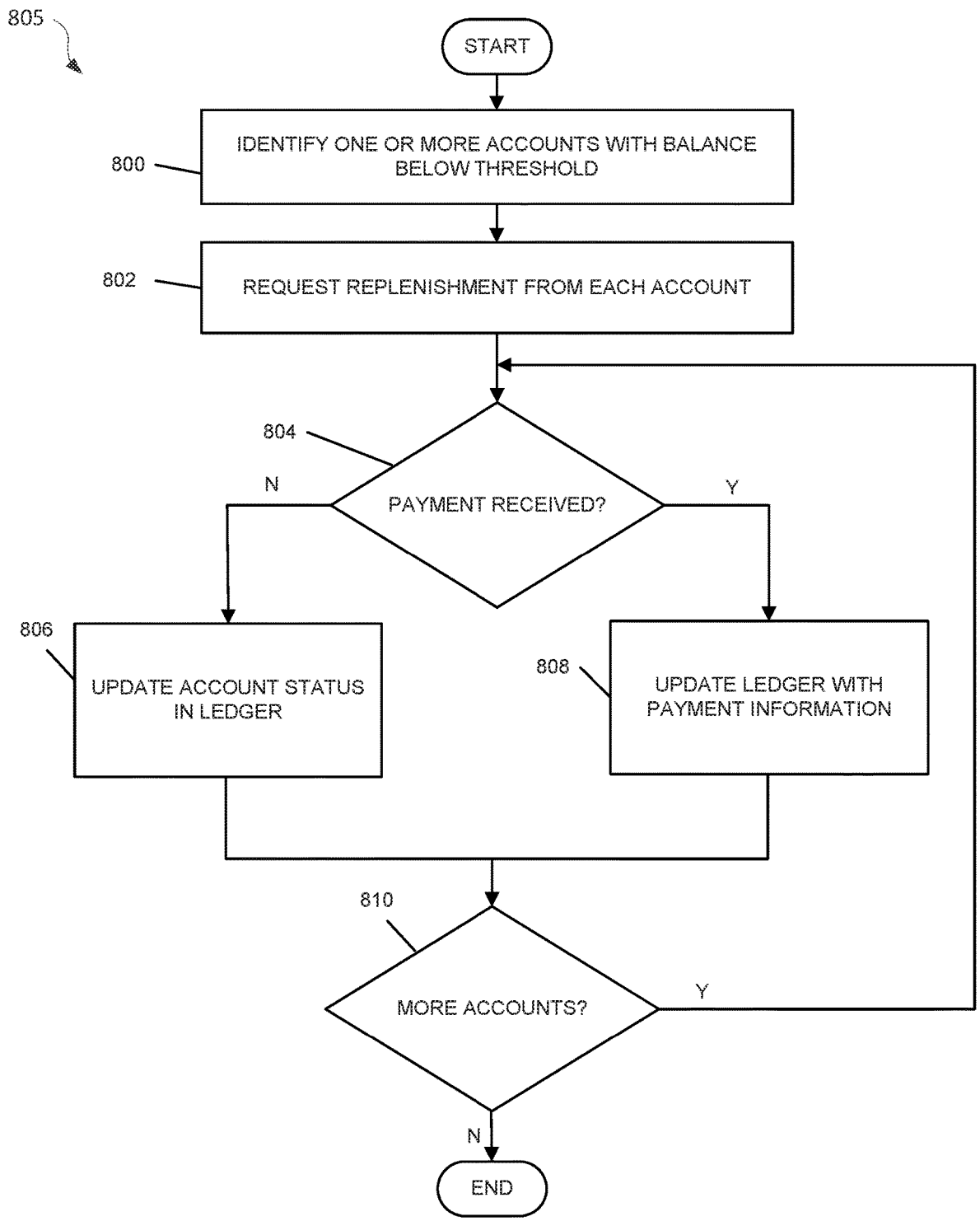
FIG. 8 shows an illustrative method of replenishing accounts according to one or more aspects described herein.

FIG. 8 shows an illustrative method 805 of replenishing accounts according to one or more aspects described herein. In step 800, one or more accounts with a balance below a threshold may be determined. In step 802, replenishment may be requested from the accounts identified as having a balance below the threshold. In step 804, a determination may be made as to whether payment has been received for, for example, a first account. If so, the ledger may be updated with payment information in step 808. If not, the account status may be updated in the ledger in step 806. Updating the account status may include flagging the account as being below the threshold, notifying the customer that his or her account is below the threshold, and/or cancelling the insurance policy associated with the account.

In step 810, a determination is made as to whether there are more accounts to determine whether payment has been received. If so, the process may return to step 804. If not, the process may end.

Figure 9:
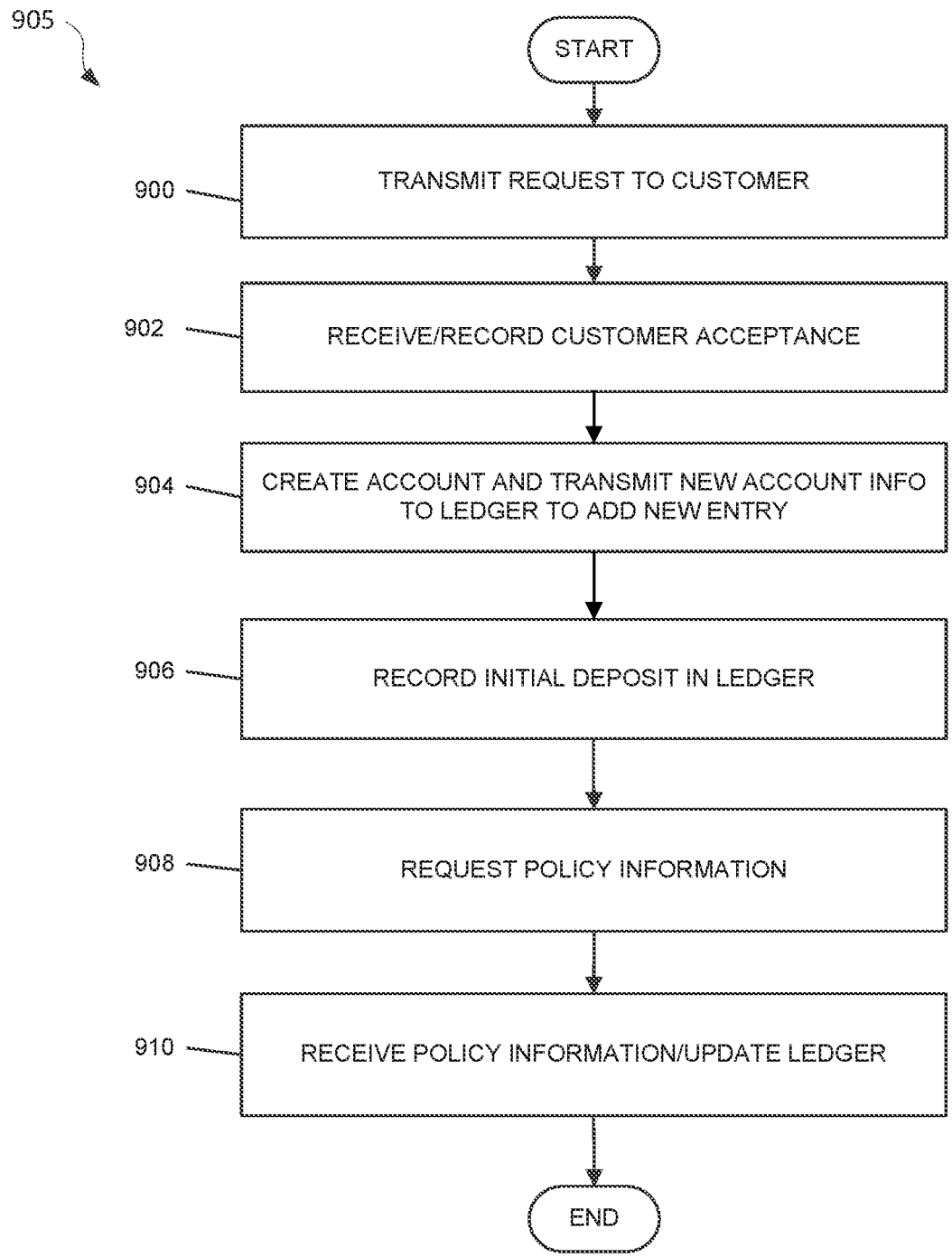
FIG. 9 shows an illustrative method of creating a new account in the system and the electronic ledger, according to one or more aspects described herein.

FIG. 9 illustrates an illustrative method 905 of creating a new account in the system and the electronic ledger, according to one or more aspects described herein. In step 900, a request may be transmitted to a customer, such as via a user interface screen displayed on a remote device. The request may include a request to open a new account, obtain a new usage-based policy, or the like. In some examples, the request may be transmitted to the customer via an electronic message, such as email, SMS, and the like. The electronic message may include a link to an Internet-based web page that the user may select if he or she desires to proceed with creating an account.

In step 902, a customer may accept the request to create a new account and the acceptance may be received and/or recorded by the system (e.g., system 200 in FIG. 2). In step 904, a new account may be created (e.g., in account module 212) and the new account information may be transmitted to the electronic ledger to create a new entry in the electronic ledger.

In step 906, an initial deposit of funds may be received and the initial deposit may be recorded in the electronic ledger. As discussed herein, the initial deposit may be an insurance premium or other amount creating a balance of funds in the usage-based insurance account from which costs per mile and/or costs per day may be deducted as a vehicle is operated. In some examples, the policy premium may be determined based on the equations discussed above.

In at least some examples, calculations may be rounded to the nearest one cent. Additionally or alternatively, calculations may vary based on a coverage level for a vehicle. For instance, a policy having more coverage may have a different rate per day or rate per mile than a policy having lower or less coverage, thereby altering the premium based on the amount of coverage associated with the policy.

In some arrangements, the initial deposit may include an adjustment for one or more fees. For instance, some states have fees that are collected on various policies. Accordingly, the initial payment may be reduced by an amount of state fees prior to any deductions being made for operating a vehicle associated with the usage-based insurance policy.

With further reference to FIG. 9, in step 908, policy information may be requested. The policy information may include information associated with the vehicle (e.g., make, model, year, etc.) and/or the driver (e.g., age, driving history, and the like). The policy information may also include information associated with a type of policy, amount of premium, amount of replenishment, and the like. This information may be provided by the customer and, in some examples, may be stored in insurance database 206. In step 910, the policy information may be received and the ledger may be updated with any policy information received. The balance of the account may be included in the ledger and, as the driver operates a vehicle, driving or trip event data may be received by the system, costs determined, and an amount deducted from the account, as discussed more fully herein.

In some examples, the ledger, initial payment, and the like, may be associated with a policy. For instance, a single policy may have multiple vehicles associated therewith. Accordingly, a single ledger entry for the policy may exist and the account balance may be reduced by costs per day and/or costs per mile for any of the vehicles associated with the policy. Additionally or alternatively, premiums may be determined at a vehicle level (e.g., each vehicle on a policy may have a different premium based on characteristics of the vehicle), and coverage level, state fees, and the like, may also be determined at a vehicle level, rather than a policy level.

Figure 10:
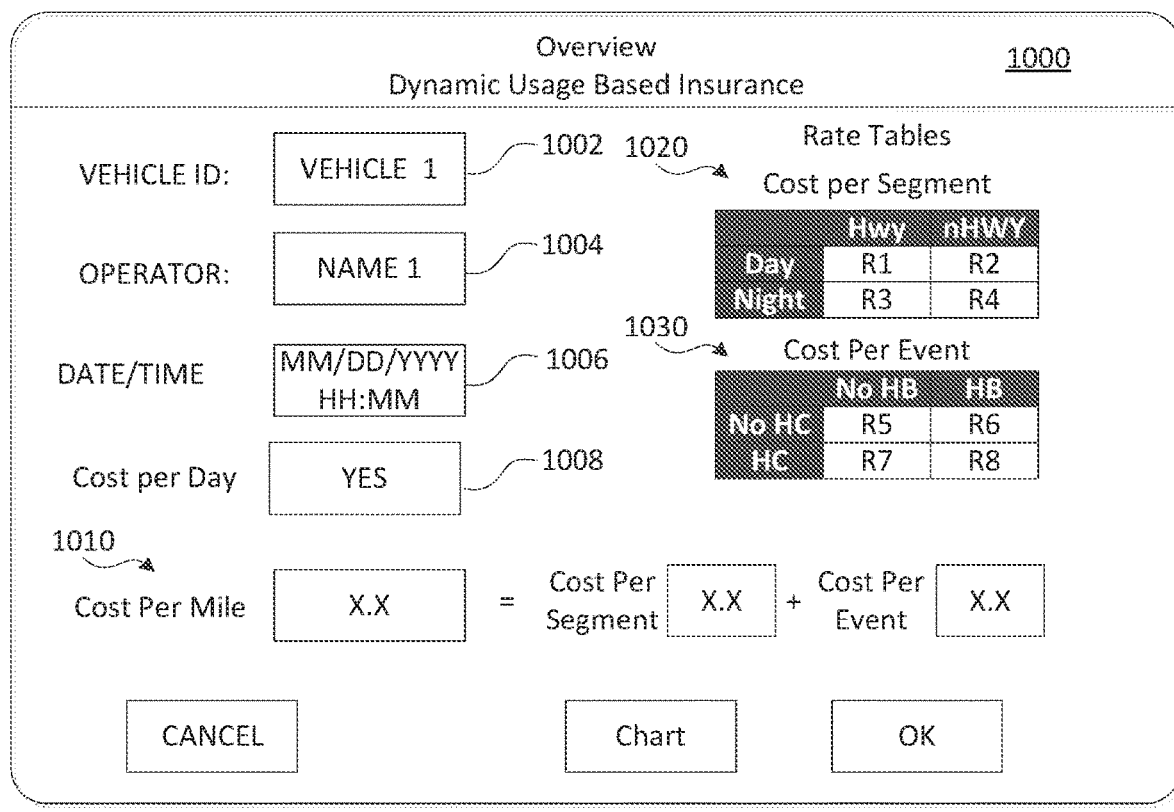
FIG. 10 shows an illustrative user interface screen that may be provided to a user to provide information associated with the dynamic usage based insurance discussed herein.
Figure 12:
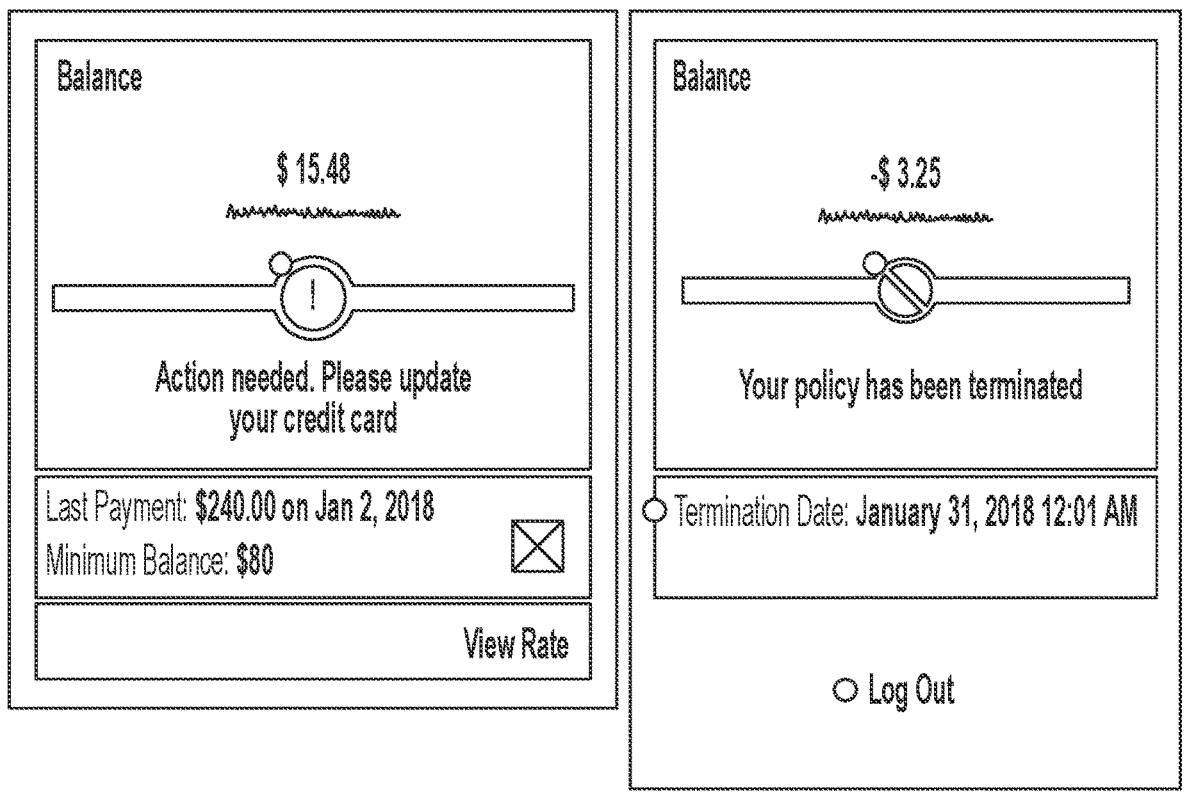
Figure 12:
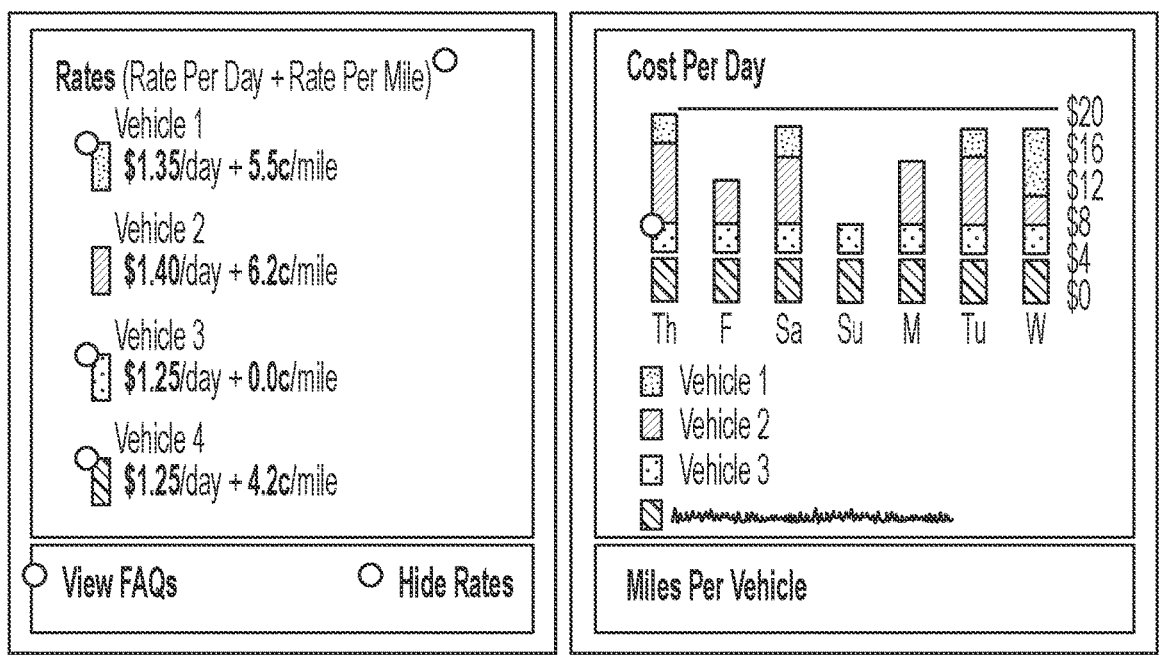
Figure 15:
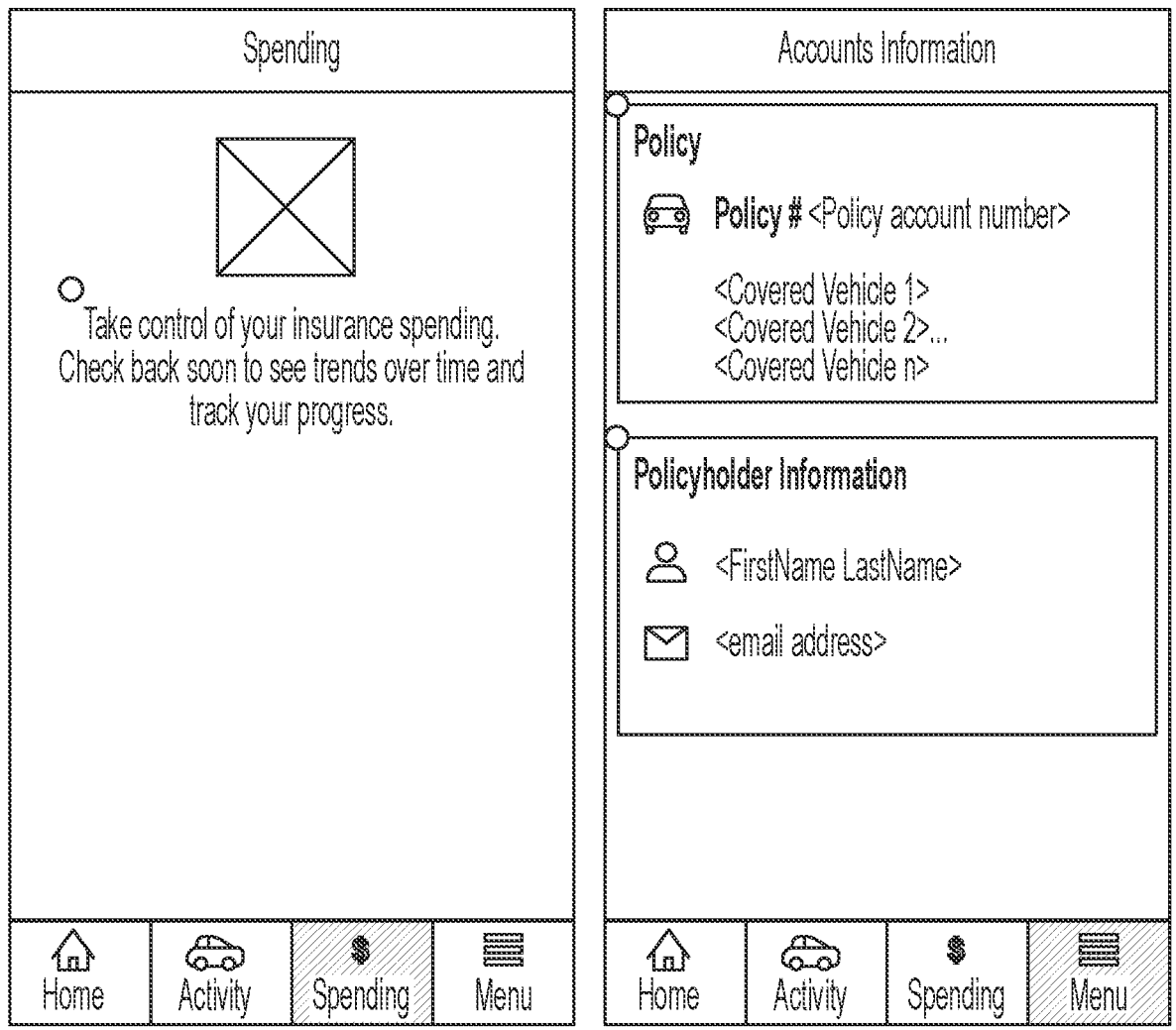

FIG. 10 shows an illustrative user interface screen 1000 that may be provided to a user (e.g., via a vehicle display, mobile device, or other computing device) to provide information associated with the dynamic usage based insurance discussed herein. The user interface screen 1000 includes fields 1002 and 1004 in which the vehicle and operator of the vehicle are identified, respectively. Field 1006 indicates a date and time of the current trip. In some examples, an elapsed time of the current trip may also be displayed and/or information corresponding to a historical trip may be displayed.

Field 1008 indicates a cost per mile being applied towards the trip and may be associated to the date listed in field 1006. As discussed herein, data associated with one or more sensors detecting driving behaviors of the user, environmental conditions, and the like, may be received by the system and used to determine the cost per mile for the dynamic usage based insurance policy associated with the user and/or the vehicle. In the event of a communication disruption the user interface screen may indicate that data is not being received or that an error has occurred. In some example situations of that nature, the system may display information of most recently displayed rates until data communication is restored and more current data is received by the system.

Field 1010 provides a calculated cost per mile associated with a current segment of the trip including a sum of a cost per segment and a cost per event. In some cases field 1010 may include an average cost per mile, cost per segment and/or cost per event rather than showing information corresponding to a particular segment. In some cases, the user may elect to display a chart or graph showing the cost per segment corresponding to a particular trip taken by the operator. Fields 1020 and 1030 provides a listing of rates associated with the cost per segment (Field 1020) and the cost per event (Field 1030) that may be useful to the user in understanding the calculation of the values in the cost per mile, the cost per segment and the cost per event fields.

FIGS. 11-15 show illustrative user interface screens, or portions thereof, that may be provided to a user to provide information associated with the dynamic usage based insurance discussed herein. For example, the user interface screens, or portions thereof, shown in FIGS. 11-15 may be generated by an insurance system server and transmitted for display on a user device, such as a computer (e.g., via a web browser), via a stand-alone application or the like, or a mobile device (e.g., via an app running on the device, a web browser, etc.). In some cases, the insurance system server 350 may communicate information to the remote user device via the network which may be used to populate fields in user interface screens stored on the remote user device (e.g., the mobile device 330, a computer, etc.).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A computing device, comprising:
one or more processors, and
memory coupled to the one or more processors and that stores instructions that, when executed by the one or more processors, cause the computing device to:
receive, from a user associated with a vehicle, a quantity of funds associated with an insurance policy;
store the quantity of funds in an account;
receive, from a telematics computing device located within the vehicle and communicatively coupled to a plurality of sensors associated with the vehicle, driving data associated with operation of the vehicle during a driving trip comprising a plurality of segments; and
after the driving trip:
determine, for each segment of the plurality of segments of the driving trip, a corresponding portion of the driving data;
calculate a plurality of costs by determining a segment cost for each segment of the plurality of segments and by analyzing the portion of the driving data that corresponds to a particular segment;
cause display of a user interface that indicates each of the plurality of costs by causing display, for each segment of the plurality of segments, of the segment cost;
determine, based on the plurality of costs, a cost of the driving trip; and
reduce a balance of the account by the cost of the driving trip.

2. The computing device of claim 1, wherein the driving data comprises indications of one or more of:
location information captured during the driving trip,
velocity information captured during the driving trip, or
acceleration information captured during the driving trip.

3. The computing device of claim 1, wherein the cost calculated for each of the plurality of segments is based on one or more of:
a time duration of the driving trip,
a road type of a road traveled during the driving trip, or
a driving behavior identified during the driving trip.

4. The computing device of claim 1, wherein the instructions, when executed by the one or more processors, further cause the computing device to:
receive environmental condition data for the driving trip, wherein the cost calculated for each of the plurality of segments is based on the environmental condition data.

5. The computing device of claim 1, wherein the instructions, when executed by the one or more processors, cause the computing device to analyze the driving data by determining, for the plurality of segments, one or more of:
a time of day that the vehicle traveled each of the plurality of segments,
a road type upon which the vehicle traveled during each of the plurality of segments, or
whether one or more driving behaviors occurred.

6. The computing device of claim 1, wherein the instructions, when executed by the one or more processors, cause the computing device to:
responsive to determining that the balance is below a threshold, initiate a transfer of funds from a payment account to the account.

7. The computing device of claim 1, wherein the instructions, when executed by the one or more processors, cause the computing device to:
determine a number of hard braking events, wherein determining the cost of the driving trip is based on the number of hard braking events.

8. The computing device of claim 1, wherein the driving data indicates night driving, wherein night driving is identified based on a location of the vehicle and a time when the vehicle was driven.

9. A method comprising:
receiving, from a user associated with a vehicle, a quantity of funds associated with an insurance policy;
storing the quantity of funds in an account;
receiving, from a telematics computing device located within the vehicle and communicatively coupled to a plurality of sensors associated with the vehicle, driving data associated with operation of the vehicle during a plurality of segments; and
after receiving the driving data:
determining, for each segment of the plurality of segments, a corresponding portion of the driving data;
calculating a plurality of costs by determining a segment cost for each segment of the plurality of segments and by analyzing the portion of the driving data that corresponds to a particular segment;

causing display of a user interface that indicates each of the plurality of costs by causing display, for each segment of the plurality of segments, of the segment cost;

determining, based on the plurality of costs, a cost of a driving trip; and reducing a balance of the account by the cost of the driving trip.

10. The method of claim 9, further comprising:
determining a number of hard braking events, wherein determining the cost of the driving trip is based on the number of hard braking events.

11. The method of claim 9, further comprising:
receiving environmental condition data for the driving trip, wherein the cost calculated for each of the plurality of segments is based on the environmental condition data.

12. The method of claim 9, wherein the driving data indicates night driving.

13. The method of claim 12, wherein night driving is identified based on a location of the vehicle and a time when the vehicle was driven.

14. The method of claim 9, wherein a cost of the driving trip is based on the driving trip being associated with highway driving.

15. The method of claim 9, further comprising:
determining a number of hard braking events, wherein determining a cost of the driving trip is based on the number of hard braking events.

16. A non-transitory computer readable medium embodying computer-executable instructions, that when executed by a processor, cause the processor to:

receive, from a user associated with a vehicle, a quantity of funds associated with an insurance policy;

store the quantity of funds in an account;

receive, from a telematics computing device located within the vehicle and communicatively coupled to a plurality of sensors associated with the vehicle, driving data associated with operation of the vehicle during a driving trip, wherein the driving trip is associated with a plurality of segments; and after the driving trip:
determine, for each segment of the plurality of segments of the driving trip, a corresponding portion of the driving data;

calculate a plurality of costs by determining a segment cost for each segment of the plurality of segments and by analyzing the portion of the driving data that corresponds to a particular segment;

cause display of a user interface that indicates each of the plurality of costs by causing display of each segment of the plurality of segments; and reduce a balance of the account by the cost of the driving trip comprising the plurality of segments.

17. The non-transitory computer readable medium of claim 16, further comprising instructions to:
determine a plurality of rates for calculating a cost per road segment for a plurality of different road segments based on a distance of the driving trip.

18. The non-transitory computer readable medium of claim 16, wherein the driving data comprises indications of one or more of:
location information captured during the driving trip,
velocity information captured during the driving trip, or
acceleration information captured during the driving trip.

19. The non-transitory computer readable medium of claim 16, further comprising instructions to:
receive environmental condition data for the driving trip, wherein the cost calculated for each of the plurality of segments is based on the environmental condition data.

20. The non-transitory computer readable medium of claim 16, further comprising instructions to:
determine a number of hard braking events, wherein determining the cost of the driving trip is based on the number of hard braking events.

* * * * *